(12) United States Patent
Ishida et al.

(10) Patent No.: US 11,276,197 B2
(45) Date of Patent: Mar. 15, 2022

(54) INFORMATION PROCESSING APPARATUS AND SUBJECT INFORMATION ACQUISITION METHOD

(71) Applicant: Sony Interactive Entertainment Inc., Tokyo (JP)

(72) Inventors: Takayuki Ishida, Tokyo (JP); Hiroyuki Segawa, Kanagawa (JP); Shinya Wada, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/050,879

(22) PCT Filed: May 8, 2018

(86) PCT No.: PCT/JP2018/017841
§ 371 (c)(1),
(2) Date: Oct. 27, 2020

(87) PCT Pub. No.: WO2019/215821
PCT Pub. Date: Nov. 14, 2019

(65) Prior Publication Data
US 2021/0233270 A1    Jul. 29, 2021

(51) Int. Cl.
*G06T 7/73* (2017.01)
*G06K 9/46* (2006.01)

(52) U.S. Cl.
CPC .............. *G06T 7/73* (2017.01); *G06K 9/4661* (2013.01); *G06T 2207/30244* (2013.01)

(58) Field of Classification Search
CPC .. G06T 7/136; G06T 7/50; G06T 7/55; G06T 7/70; G06T 7/73; G06T 7/97; G06T 2207/30244; G06K 9/4661
See application file for complete search history.

(56) References Cited

U.S. PATENT DOCUMENTS

| 6,329,988 B1 | 12/2001 | Watanabe et al. |
| 7,737,975 B2 | 6/2010 | Sato et al. |

(Continued)

FOREIGN PATENT DOCUMENTS

| JP | 2016133396 A | 7/2016 |
| WO | 2009147814 A1 | 12/2009 |
| WO | 2016181687 A1 | 11/2016 |

OTHER PUBLICATIONS

International Search Report for corresponding PCT Application No. PCT/JP2018/017841, 3 pages, dated Jul. 24, 2018.

(Continued)

*Primary Examiner* — Andrew W Johns
(74) *Attorney, Agent, or Firm* — Matthew B. Dernier, Esq.

(57) ABSTRACT

A captured image acquisition section of an information processing apparatus acquires polarization image data including polarization information in a plurality of azimuths. An imaging apparatus information acquisition section acquires information regarding a position and posture of an imaging apparatus. A viewpoint control section of a subject information acquisition section controls a plurality of viewpoints from which polarization images are captured. A point-of-interest information acquisition section sets a pixel of interest having a degree of polarization equal to or higher than a threshold in a polarization image of a first viewpoint, identifies a pixel representing the same point of interest in a polarization image of a second viewpoint, and then obtains a line of intersection between incident planes acquired for the respective viewpoints as a normal vector. An output data generation section generates output data based on results thereof and outputs the data.

13 Claims, 14 Drawing Sheets

(56) References Cited

U.S. PATENT DOCUMENTS

| | | |
|---|---|---|
| 7,948,514 B2 | 5/2011 | Sato et al. |
| 9,025,027 B2 | 5/2015 | Xue et al. |
| 9,626,767 B2 | 4/2017 | Ida et al. |
| 10,229,483 B2 | 3/2019 | Doba et al. |
| 10,529,076 B2 | 1/2020 | Lu et al. |
| 2009/0135183 A1 | 5/2009 | Sato et al. |
| 2009/0279807 A1 | 11/2009 | Kanamori et al. |
| 2010/0283883 A1 | 11/2010 | Sato et al. |
| 2010/0289878 A1 | 11/2010 | Sato et al. |
| 2012/0069181 A1 | 3/2012 | Xue et al. |
| 2012/0086950 A1 | 4/2012 | Sho et al. |
| 2012/0262715 A1 | 10/2012 | Sakai et al. |
| 2012/0307028 A1 | 12/2012 | Kanamori |
| 2013/0123985 A1 | 5/2013 | Hirai et al. |
| 2014/0104307 A1 | 4/2014 | Tanaka |
| 2014/0184800 A1 | 7/2014 | Hirai et al. |
| 2014/0300897 A1 | 10/2014 | Treado et al. |
| 2014/0303463 A1 | 10/2014 | Robinson et al. |
| 2014/0327902 A1 | 11/2014 | Giger et al. |
| 2016/0210754 A1 | 7/2016 | Ida et al. |
| 2016/0267348 A1 | 9/2016 | Kondo |
| 2017/0124689 A1 | 5/2017 | Doba et al. |
| 2018/0139365 A1 | 5/2018 | Kanamori et al. |
| 2018/0213170 A1 | 7/2018 | Segawa et al. |
| 2020/0175297 A1 | 6/2020 | Ogasawara |
| 2021/0243374 A1* | 8/2021 | Ishida et al. ....... H04N 5/23222 |

OTHER PUBLICATIONS

Jeremy Riviere, et al. "Polarization imaging reflectometry in the wild" Technical Report Aug. 2016, ACM Transactions on Graphics, vol. 36, No. 6, pp. 206:1-206:14, Nov. 1, 2017.

Zhaopeng Cui, et al. "Polarimetric Multi-View Stereo" Proceedings of the IEEE Conference on Computer Vision and Pattern Recognition, pp. 1558-1567, Jul. 1, 2017.

International Preliminary Report on Patentability and Written Opinion for corresponding PCT Application No. PCT/JP2018/017841, 11 pages, dated Nov. 10, 2020.

International Preliminary Report on Patentability and Written Opinion for related PCT Application No. PCT/JP2018/017840, 11 pages, dated Nov. 19, 2020.

International Search Report for related PCT Application No. PCT/JP2018/017840, 2 pages, dated Jul. 24, 2018.

\* cited by examiner

F I G . 1
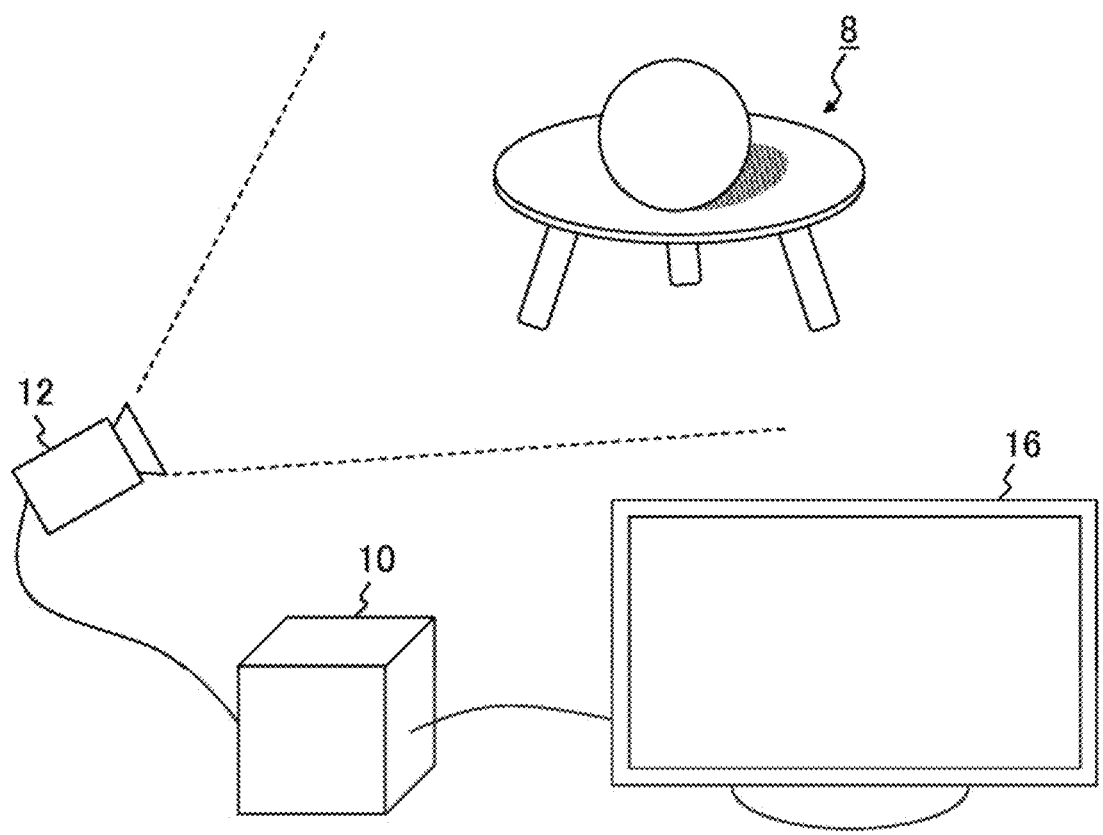

FIG.4
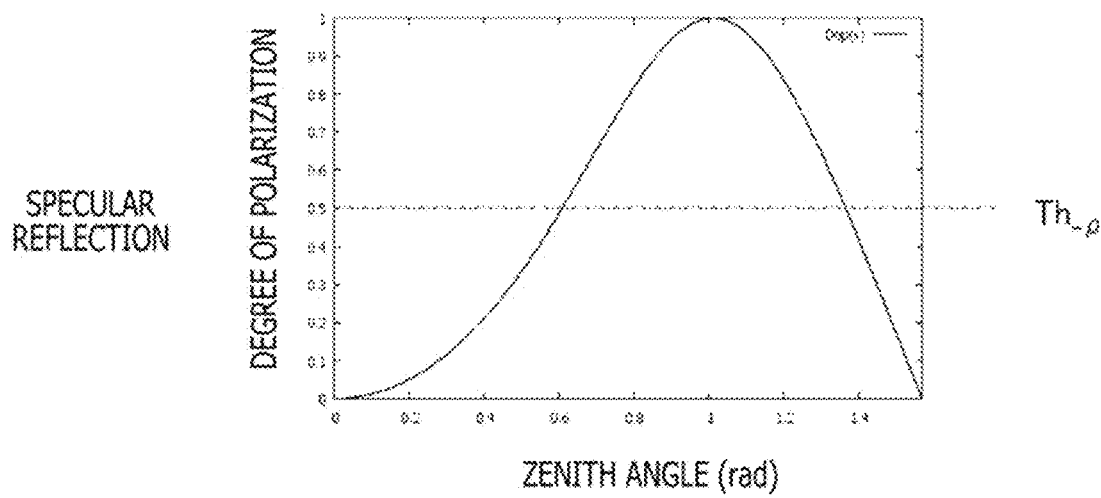
SPECULAR REFLECTION
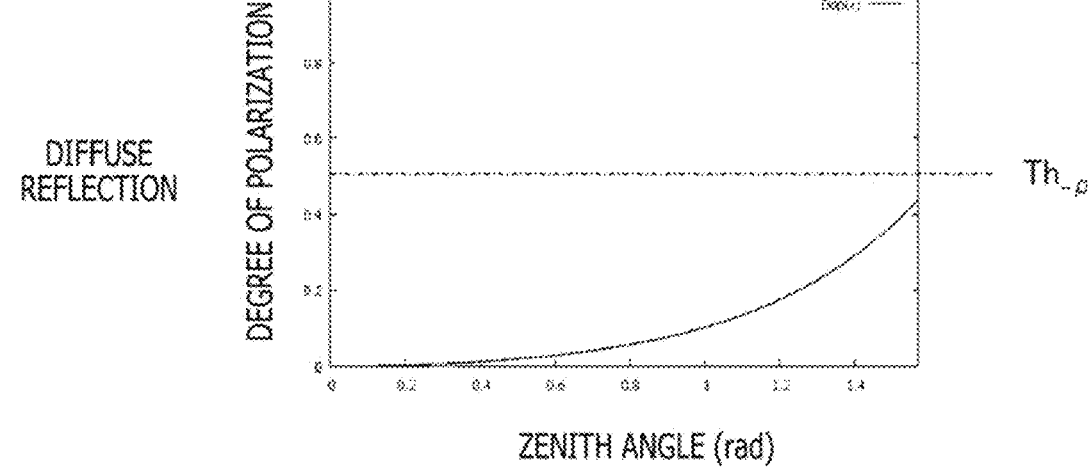
DIFFUSE REFLECTION
FIG.5
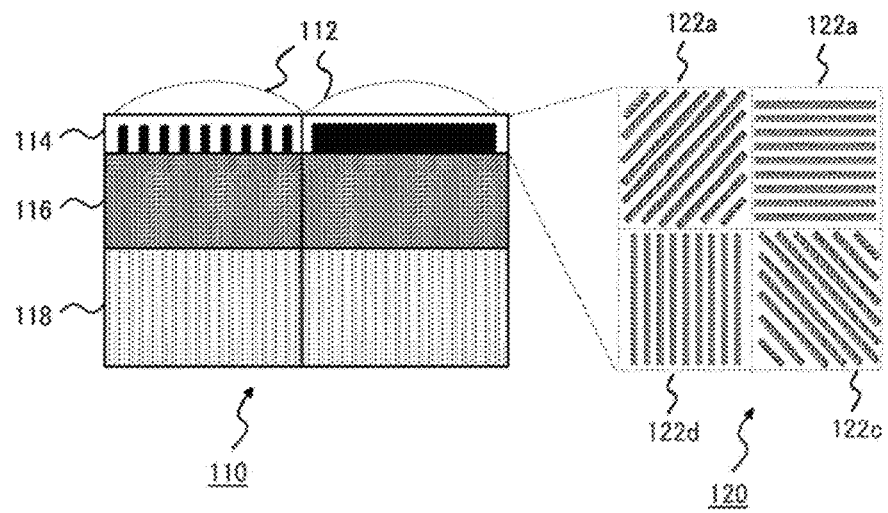

FIG.13
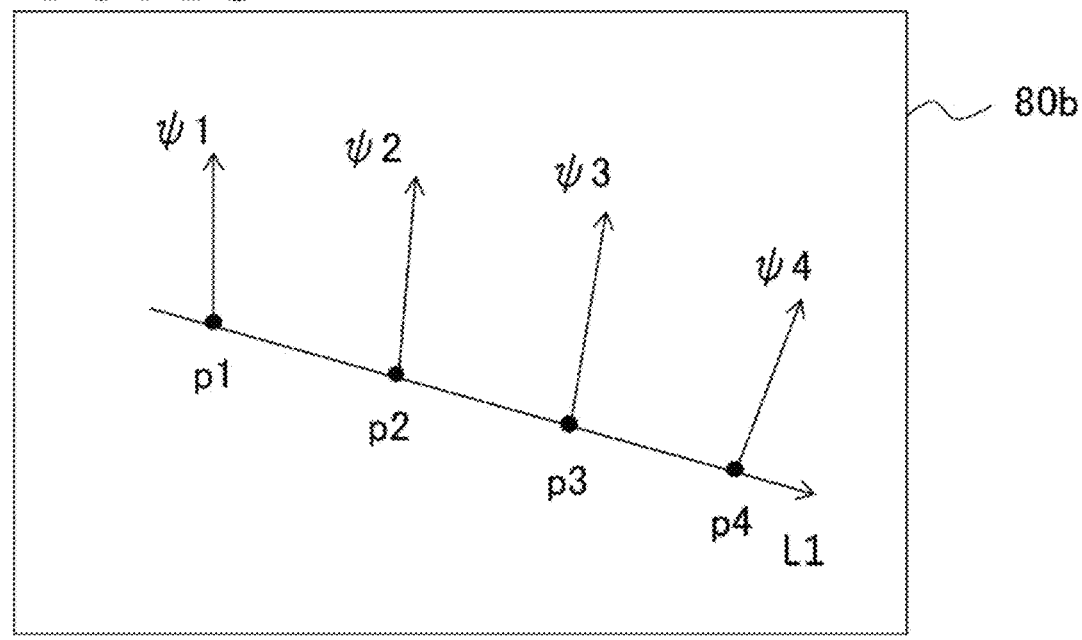
FIG.14
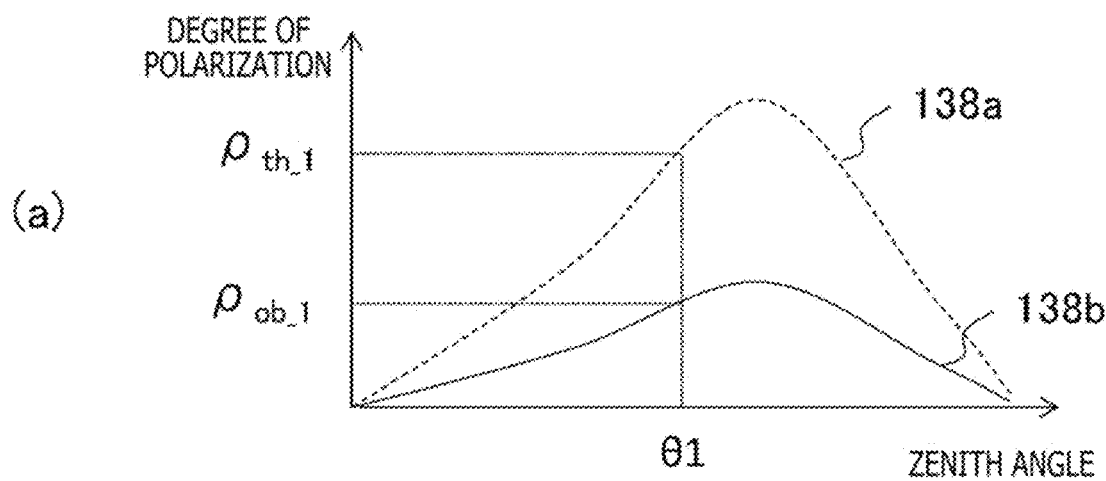
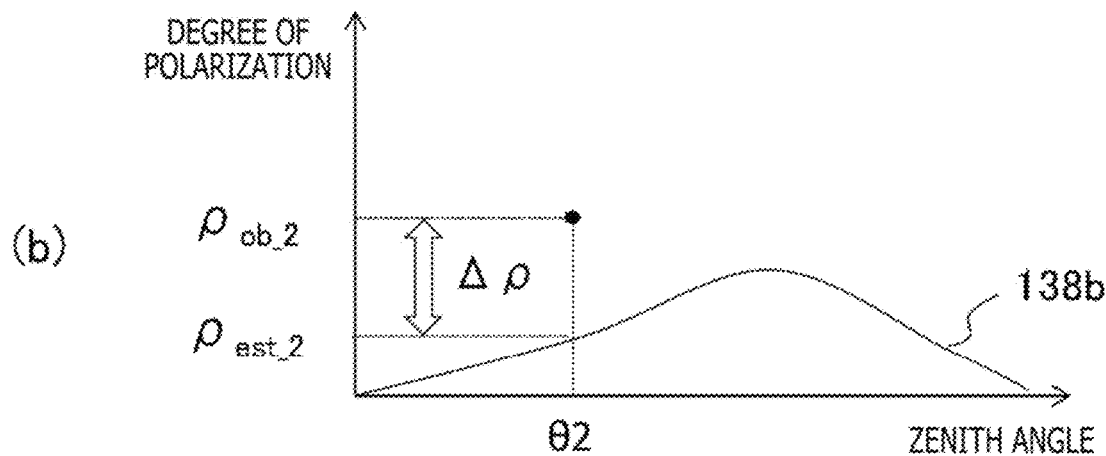

INFORMATION PROCESSING APPARATUS AND SUBJECT INFORMATION ACQUISITION METHOD

TECHNICAL FIELD

The present invention relates to an information processing apparatus and a subject information acquisition method for acquiring states of a subject by using a captured image.

BACKGROUND ART

There have been available techniques to recognize a certain object in a subject space and detect its position and posture by analyzing a captured image, finding application in a wide range of fields including electronic content such as games, object and space modeling, and monitoring cameras. Various techniques are under study as techniques for acquiring three-dimensional information such as position and posture from two-dimensional information of a subject in the captured image, and there has been proposed, for example, a technique for obtaining a normal on an object surface by using a polarization image (refer, for example, to NPL 1 and NPL 2).

CITATION LIST

Non Patent Literatures

[NPL 1] Jeremy Riviere, et al. "Polarization imaging reflectometry in the wild," Technical Report 2016/8, Department of Computing. Imperial College London, ISSN 1469-4174, May 2016.

[NPL 2] Zhaopeng Cui, et al. "Polarimetric Multi-View Stereo," Proceedings of the IEEE Conference on Computer Vision and Pattern Recognition, 2017.

SUMMARY

Technical Problems

Image analysis based on polarized light generally focuses on a change in luminance relative to a polarization azimuth, thus offering high robustness to surrounding brightness, presence or absence of feature points on a subject surface, and so on. Meanwhile, observed light includes specular reflection and diffuse reflection, two kinds of light that differ in a manner of reflection, possibly resulting in degraded computation accuracy depending on an aptitude of a model.

For this reason, application scenes are limited such as using image analysis in combination with information regarding a distance to the subject obtained separately by a stereo camera or infrared radiation as supplemental means and using image analysis for a material whose manner of reflection is known. Although techniques called inverse rendering have been proposed that calculate observed light by assuming unknown parameters such as material and normal and derive such parameters in such a manner as to achieve a match with actual observation results, these techniques involve a high processing load, making them disadvantageous under a situation where high response speed, in particular, is required.

The present invention has been devised in light of the foregoing problems, and it is an object of the present invention to provide a technique for readily acquiring subject information by using a polarization image.

Solution to Problems

A mode of the present invention relates to an information processing apparatus. This information processing apparatus includes a captured image acquisition section adapted to acquire data of polarization images in a plurality of azimuths captured by an imaging apparatus from different viewpoints, an imaging apparatus information acquisition section adapted to acquire information regarding a position and posture of the imaging apparatus as viewpoint information, and a point-of-interest information acquisition section adapted to set, of each of the polarization images, a pixel whose degree of polarization is equal to or higher than a given threshold or is maximum, as a pixel of interest, acquire state information of a point of interest on a subject represented by the pixel of interest in a world coordinate system on a basis of polarization luminance from the same point of interest observed at each viewpoint, and output the state information.

Another mode of the present invention relates to a subject information acquisition method. This subject information acquisition method includes a step of acquiring data of polarization images in a plurality of azimuths captured by an imaging apparatus from different viewpoints, a step of acquiring information regarding a position and posture of the imaging apparatus as viewpoint information, and a step of setting, of each of the polarization images, a pixel whose degree of polarization is equal to or higher than a given threshold or is maximum, as a pixel of interest, acquiring state information of a point of interest on a subject represented by the pixel of interest in a world coordinate system on a basis of polarization luminance from the same point of interest observed at each viewpoint, and outputting the state information.

It should be noted that any combinations of the above components and conversions of expressions of the present invention between a method, an apparatus, and the like are also effective as modes of the present invention.

Advantageous Effect of Invention

According to the present invention, it is possible to readily acquire information regarding a position and posture of a subject by using a polarization image.

BRIEF DESCRIPTION OF DRAWINGS

FIG. 1 is a diagram illustrating a configuration example of an information processing system in the present embodiment.

FIG. 4 is a diagram comparing change in a degree of polarization relative to a zenith angle of a normal vector between specular reflection and diffuse reflection.

FIG. 5 is a diagram illustrating an example of a structure of an imaging device having a polarizer layer that can be introduced into an imaging apparatus in the present embodiment.

FIG. 13 is a diagram schematically illustrating a manner in which a line-of-sight vector from a first viewpoint is projected onto an image plane of a second viewpoint in the present embodiment.

FIG. 14 depicts diagrams for describing a technique for evaluating a reliability level of the normal vector by use of a relation between the zenith angle and the degree of polarization in S40 in FIG. 12.

DESCRIPTION OF EMBODIMENT

Figure 2:
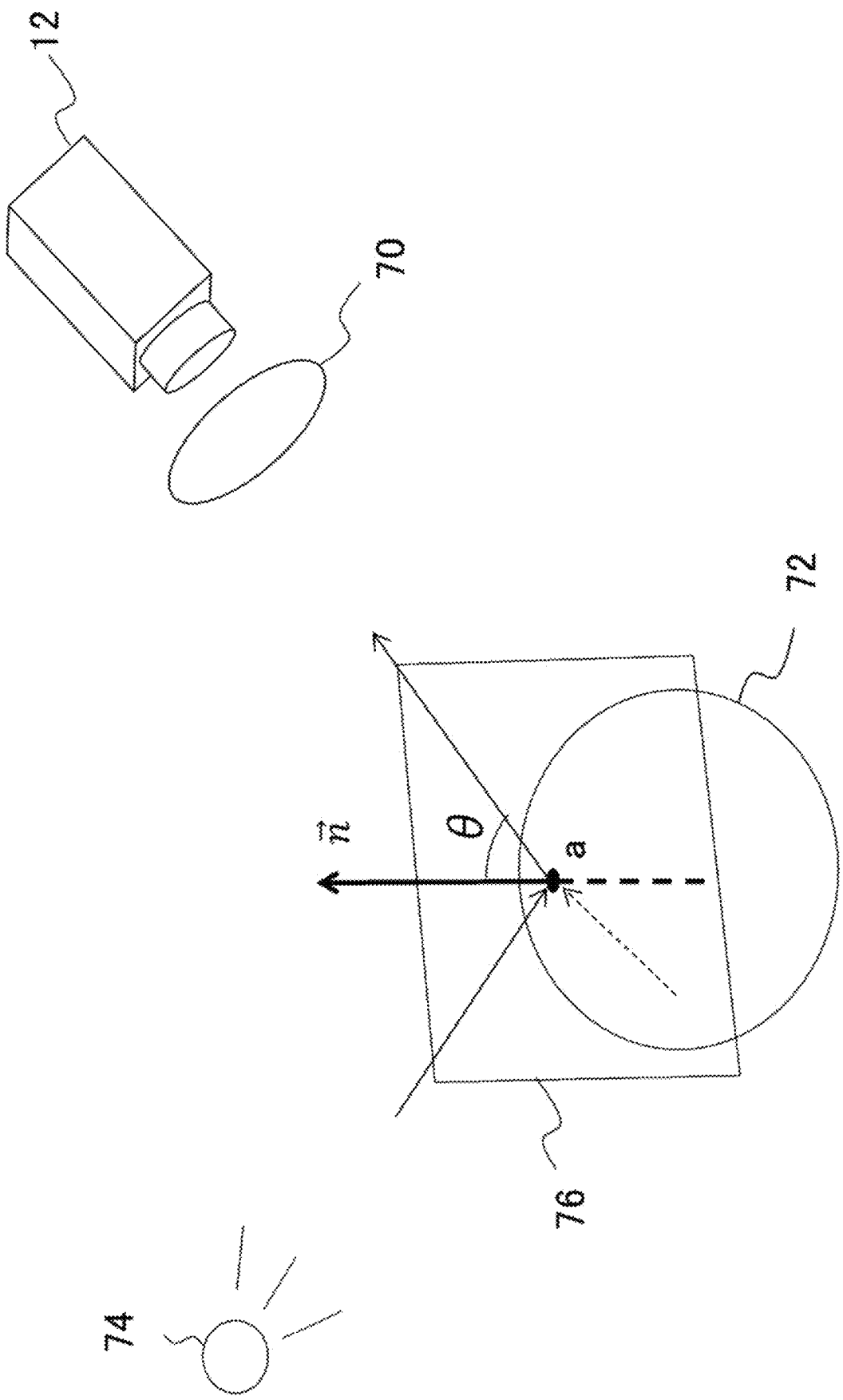
FIG. 2 is a diagram schematically illustrating a capturing environment of polarization images used in the present embodiment.

FIG. 1 illustrates a configuration example of an information processing system in the present embodiment. This information processing system includes an imaging apparatus 12, an information processing apparatus 10, and a display apparatus 16. The imaging apparatus 12 captures an image of a subject 8. The information processing apparatus 10 acquires data of the captured image and performs a given information processing task. The display apparatus 16 outputs a result of the information processing. The information processing system may further include an input apparatus that accepts operation on the information processing apparatus 10 from a user. The information processing apparatus 10 may further be capable of communicating with an external apparatus such as a server by connecting to a network such as the Internet.

The information processing apparatus 10, the imaging apparatus 12, and the display apparatus 16 may be connected by cables or wirelessly by wireless local area network (LAN) or the like. Also, two or more of the information processing apparatus 10, the imaging apparatus 12, and the display apparatus 16 may be combined into an integral apparatus. For example, an information processing system may be realized by using a camera or a mobile terminal having these apparatuses. In the case of using a camera, an electronic finder may be used as the display apparatus 16. Alternatively, a head-mounted display that is worn on the user's head and displays an image in front of the user's eyes may be used as the display apparatus 16, and the imaging apparatus 12 may be provided on the head-mounted display in such a manner as to capture an image corresponding to a user's line of sight. In any case, the information processing apparatus 10, the imaging apparatus 12, and the display apparatus 16 are not limited to those illustrated in appearance and shape.

In such a system, the information processing apparatus 10 acquires polarization image data captured by the imaging apparatus 12 and identifies at least either a normal at a point of interest on the subject 8 or a position in a three-dimensional space. Then, as a result thereof, the information processing apparatus 10 generates image and sound data and outputs the data to the display apparatus 16. There may be one or a plurality of points of interest on the subject 8. For example, it is possible to identify the shape of the subject 8 by setting points of interest with density equal to or higher than a given value on the subject 8 and obtaining each position.

If, on top of that, the normal at one of the points of interest is obtained at a given frequency, a change in posture of the subject 8 can be acquired. Naturally, the change in posture of the subject 8 and a destination thereof can be acquired by continuously acquiring the positions of all the points of interest. Hereinafter, the normals at the points of interest and the positions thereof and the shape and posture of the subject may be collectively referred to as "subject state information." Contents of data to be output from the information processing apparatus 10 on the basis of subject state information acquired by using a polarization image are not limited.

For example, data that represents acquired state information itself may be output, or an environmental map of a subject space may be generated by integrating these pieces of data and output. Alternatively, information processing may be performed separately by using such state information, followed by output of the result thereof by image or sound. For example, an electronic game or an arbitrary information processing task may be progressed by using a given target included in the subject 8 as a controller of the game and recognizing a motion thereof as user operation.

Alternatively, a virtual world may be represented by replacing a subject space including the subject 8 with a virtual object, or a virtual object interacting with the subject 8 may be drawn on a captured image. A virtual world drawn within a field of view corresponding to the user's line of sight may be displayed on the head-mounted display by modeling the real world as a virtual object. Subject state information acquired by using a polarization image may be stored temporarily in a storage apparatus or the like for use for other information processing task at a later time.

FIG. 2 schematically illustrates a capturing environment of polarization images used in the present embodiment. The imaging apparatus 12 captures an image of a space including a subject 72 via a linear polarizer plate 70. In more details, the imaging apparatus 12 observes, of reflected light that includes a specular reflection component obtained as a result of causing light emitted from a light source 74 to be reflected by the subject 72 and a diffuse reflection component obtained as a result of causing the light emitted from the light source 74 to be scattered inside the subject 72, polarized light that has passed through the linear polarizer plate 70.

Here, the linear polarizer plate 70 transmits, of reflected light that reaches the imaging apparatus 12 from the subject 72, only linear polarized light oscillating in a certain direction (referred to as a "polarization azimuth"). The rotation of the linear polarizer plate 70 about an axis vertical to its surface allows for the polarization azimuth to be set up in an arbitrary direction. Assuming that light that reaches the imaging apparatus 12 is non-polarized light, observed luminance is constant even if the linear polarizer plate 70 is rotated. Meanwhile, when partially polarized, common reflected light experiences change in luminance observed in the polarization azimuth.

Light observed as a silhouette of a point of interest 'a' on the subject 72 is reflected light inside an incident plane 76 including a normal vector n of the subject 72 at that position. It is known that so-called s polarized light that oscillates in a direction vertical to the incident plane 76 is predominant in specular reflection and that so-called p polarized light that oscillates in a direction parallel to the incident plane 76 is predominant in diffuse reflection. Also, a ratio between s polarized light and p polarized light depends upon an angle θ (referred to as a "zenith angle") formed between the normal vector n and a light beam observed on the incident plane 76.

For this reason, an extent of polarization, i.e., a degree of polarization, and a polarization phase vary depending upon the incident plane 76, determined by the relation between the viewpoint of the imaging apparatus 12 and the normal vector n of the point of interest 'a,' the zenith angle θ, and the ratio between specular reflection and diffuse reflection. In other words, it is possible to estimate the normal vector n as seen from the imaging apparatus 12 by rotating the linear polarizer plate 70 and acquiring a change in luminance relative to a polarization azimuth after assuming the ratio between specular reflection and diffuse reflection. It should be noted that, in the description given hereinafter, the term "obtain an incident plane" refers to obtaining an incident plane angle on a captured image plane or in a three-dimensional space. Also, the term "viewpoint" of the imaging apparatus 12 can include a lens direction in addition to a lens center position of the imaging apparatus 12.

Figure 3:
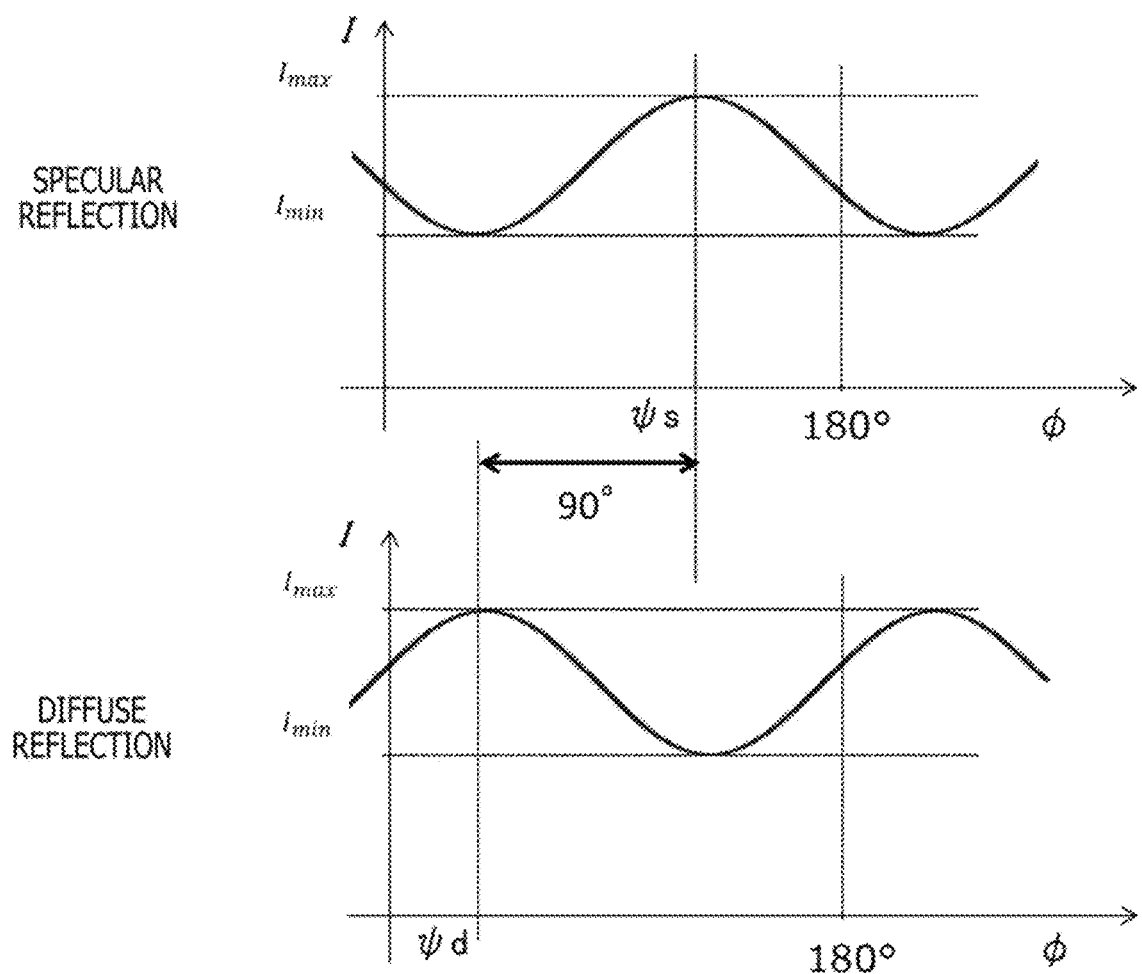
FIG. 3 depicts diagrams each illustrating change in luminance relative to a polarization azimuth used in the present embodiment.

FIG. 3 illustrates change in luminance I relative to the polarization azimuth Φ. The graph on the upper side in FIG. 3 illustrates a case where specular reflection is predominant, and the graph on the lower side in FIG. 3 illustrates a case where diffuse reflection is predominant, and each is in a shape of a sine wave with a 180° period. Meanwhile, a polarization azimuth ψs when the luminance I in specular reflection has a maximum value Imax differs by 90° from a polarization azimuth ψd when the luminance I in diffuse reflection has the maximum value Imax. This is attributable, as described above, to the fact that the s polarized light is predominant in specular reflection and that the p polarized light is predominant in diffuse reflection.

Considering the fact that the s polarized light is oscillation vertical to the incident plane and that the p polarized light is oscillation parallel to the incident plane, the polarization azimuth (ψs−90°) that provides the lowest luminance in specular reflection or the polarization azimuth ψd that provides the highest luminance in diffuse reflection represents the angle of the incident plane. The normal vector n is always included in the incident plane. Therefore, the angle in question represents the angle of the vector obtained by projecting the normal vector n onto the captured image plane. This angle is commonly referred to as an azimuth angle of the normal vector n. Obtaining the zenith angle on the incident plane in addition to the azimuth angle in question allows for a normal vector to be uniquely determined in a three-dimensional space as seen from the imaging apparatus 12. Hereinafter, the polarization azimuth that provides the maximum luminance of observed polarized light will be referred to as a phase angle ψ. The change in the luminance I illustrated in FIG. 3 can be expressed by the following formula by using the phase angle ψ.

[Math. 1]

$$I = \frac{I_{max} + I_{min}}{2} + \frac{I_{max} - I_{min}}{2}\cos(2\phi - 2\varphi) \qquad \text{(Formula 1)}$$

$I_{max}$, $I_{min}$, and ψ can be obtained by approximating the luminance observed for the plurality of polarization azimuths Φ resulting from the rotation of the linear polarizer plate 70 to a format of Formula 1 by using the least squares method or the like. Of these, $I_{max}$ and $I_{min}$ can be used to obtain a degree of polarization ρ by using the following formula.

[Math. 2]

$$\rho = \frac{I_{max} - I_{min}}{I_{max} + I_{min}} \qquad \text{(Formula 2)}$$

FIG. 4 compares change in the degree of polarization relative to the zenith angle of the normal vector between specular reflection and diffuse reflection. In the case of specular reflection illustrated in the graph on the upper side, the degree of polarization takes on a maximum value of up to 1.0. In contrast, in the case of diffuse reflection illustrated in the graph on the lower side, the degree of polarization takes on a maximum value of 0.4 or so. The angle of the incident plane relative to the phase angle ψ differs by 90° depending upon which of specular reflection and diffuse reflection is predominant. That is, even if the phase angle ψ is obtained by expressing the change in luminance relative to the polarization azimuth as in Formula 1, a 90° uncertainty occurs on the incident plane.

For this reason, the normal vector is identified in the present embodiment on the basis of a specular reflection model by setting a threshold $Th_\rho$ for the degree of polarization, selecting a point having a greater degree of polarization, and specifying this point as a point of interest. That is, a behavior of the luminance of polarized light having a degree of polarization equal to or higher than the threshold $Th_\rho$ relative to the polarization azimuth is approximated to the format of Formula 1, and the polarization azimuth (Ψ−90°) that provides the lowest luminance in question is used as the angle of the incident plane. It should be noted that a degree of polarization $\rho_s$ of specular reflected light can be expressed by the following formula as a function of the zenith angle θ and a refractive index η of the subject.

[Math. 3]

$$\rho_s(\eta, \theta) = \frac{2\sin^2\theta\cos\theta\sqrt{\eta^2 - \sin^2\theta}}{\eta^2 - \sin^2\theta - \eta^2\sin^2\theta + 2\sin^4\theta} \qquad \text{(Formula 3)}$$

The illustrated degree of polarization typically represents the case where the refractive index η is 1.6. A common artifact has a refractive index that does not change significantly and remains approximately between 1.5 and 1.6. Therefore, it is safe to assume that the threshold $Th_\rho$ is constant irrespective of the subject. It should be noted, however, that the threshold $Th_\rho$ may be set in a rigorous manner to suit the material of the subject. Also, in the present embodiment, the change in the degree of polarization of specular reflection relative to the zenith angle ψ ill be used to evaluate the reliability level of the estimated normal vector as will be described later. In this case, it is also possible to make an evaluation with similar computations regardless of the subject by use of the fact that a tendency of the degree of polarization relative to the refractive index η does not change significantly. Meanwhile, the degree of polarization may be obtained in a rigorous manner depending on the subject material for use for evaluation purposes.

It is possible to derive the normal vector angle inside the incident plane, i.e., the zenith angle θ from a degree of polarization ρ by using the relation of Formula 3. However, the azimuth angle and the zenith angle of the normal vector obtained in this manner are merely with reference to the viewpoint of the imaging apparatus 12. Also, position coordinates of a point of interest in a world coordinate system cannot be acquired only from the information in question. For this reason, analysis using a polarization image is commonly often used as supplemental means to interpolate a distance value from the imaging apparatus 12 to the subject, identify a change in posture of the subject whose position is known, or the like.

Meanwhile, in the present embodiment, the viewpoint of the imaging apparatus 12 is varied freely, and of those viewpoints, at least polarization images from two thereof are analyzed, thus acquiring a plurality of incident planes for the same point of interest. Then, pieces of incident plane information, each for one of the viewpoints in question, are integrated on the basis of the positional relation between the viewpoints, thus acquiring state information at the point of interest in the world coordinate system. Specifically, because a normal vector is included in any incident plane, the normal vector is obtained in the world coordinate system from a line of intersection of at least two incident planes.

Here, the reliability level of the acquired normal vector is evaluated on the basis of the relation between the zenith angle and the degree of polarization determined by the positional relation between the normal vector and the viewpoint. Further, position coordinates of a point of interest in the world coordinate system are acquired by acquiring in which direction the point of interest is located from the two viewpoints in question. As a result, state information of the subject in the world coordinate system can be acquired by using only polarization images.

It should be noted that means of observing polarization luminance is not limited to a linear polarizer plate in the present embodiment. For example, a polarizer layer may be provided as part of an imaging device structure. FIG. 5 illustrates an example of a structure of an imaging device having a polarizer layer that can be introduced into the imaging apparatus 12 in the present embodiment. It should be noted that FIG. 5 schematically illustrates a functional structure of a cross-section of the device and that detailed structures such as an interlayer insulating film and interconnects are not depicted. An imaging device 110 includes a microlens layer 112, a wire grid type polarizer layer 114, a color filter layer 116, and a photo-detection layer 118.

The wire grid type polarizer layer 114 includes polarizers having a plurality of linear conductor members arranged in a striped pattern at spacings smaller than a wavelength of incident light. When light concentrated by the microlens layer 112 enters the wire grid type polarizer layer 114, polarization components whose azimuths are parallel to lines of the polarizer are reflected, thus allowing only polarization components vertical to the lines to pass. A polarization image is acquired by detecting the polarization components that have passed with the photo-detection layer 118. The photo-detection layer 118 has a semiconductor device structure such as that of a common charge coupled device (CCD) image sensor or a common complementary metal oxide semiconductor (CMOS) image sensor.

The wire grid type polarizer layer 114 includes an arrangement of polarizers that provide different azimuths of transmitting polarized light from one charge readout unit to another, i.e., from one pixel to another, or in larger units in the photo-detection layer 118. A polarizer arrangement 120, visible as one sees the wire grid type polarizer layer 114 from above, is illustrated on the right in FIG. 5. The lines shaded in FIG. 5 are conductors (wires) included in the polarizers. It should be noted that each of rectangles with dotted lines represents a polarizer region in one direction and that the dotted lines themselves are not actually formed.

In the example illustrated, polarizers in four directions are arranged in four regions 122a, 122b, 122c, and 122d, in two rows by two columns. In the figure, the polarizers at opposite angles have their transmission directions orthogonal to each other, and the polarizers adjacent to each other have their transmission directions that differ by 45°. That is, polarizers are provided in four directions, 45° apart from each other. These polarizers serve as a substitute for the linear polarizer plate 70, making it possible to acquire polarization information regarding four azimuths, 45° apart from each other, in regions of the photo-detection layer 118 provided underneath, each corresponding to one of the four regions 122a, 122b, 122c, and 122d. By further arranging a given number of such polarizers vertically and horizontally and connecting peripheral circuitry for controlling charge readout timings, it is possible to realize an image sensor that simultaneously acquires polarization information regarding four azimuths as two-dimensional data.

In the imaging device 110 illustrated in FIG. 5, the color filter layer 116 is provided between the wire grid type polarizer layer 114 and the photo-detection layer 118. The color filter layer 116 includes, for example, an arrangement of respective filters through which red light, green light, and blue light pass in association with the respective pixels. This provides polarization information by color in accordance with the combination of the direction of the polarizer in the wire grid type polarizer layer 114 and the filter color in the color filter layer 116 that is located under the wire grid type polarizer layer 114. That is, polarization information in the same azimuth and for the same color is obtained discretely on the image plane. As a result, a polarization image for each azimuth and for each color is obtained by interpolating the polarization information as appropriate.

Also, it is possible to reproduce a non-polarization color image by performing computations on polarization images of the same color. Image acquisition techniques using a wire grid type polarizer are also disclosed, for example, in JP 2012-80065A. It should be noted, however, that polarization luminance images are basically used in the present embodiment. Therefore, if color images are not required in other usages, the color filter layer 116 may be omitted. Also, the polarizers are not limited to a wire grid type, and linear dichroic polarizers or other type of polarizers may also be used.

In the case where azimuth dependence of polarization luminance is approximated to the format of Formula 1, polarization luminance of at least three azimuths is required for the same point of interest. According to the illustrated imaging device, polarization luminance of four azimuths can be acquired at the same time for approximately the same point on the subject, thus meeting this condition. There is only a smaller degree of freedom than the linear polarizer plate 70, and depending on the case, an approximation formula may include large error. In the present embodiment, however, points whose degree of polarization is equal to or higher than the threshold $Th_\rho$ are processed as described above. That is, only those points with a large difference between $I_{max}$ and $I_{min}$ are subject to computations, thus making it unlikely for an approximation formula to include error even in the case of polarization of limited azimuths and making it possible to obtain the phase angle $\psi$, and by extension, subject state information, with high accuracy.

Figure 6:
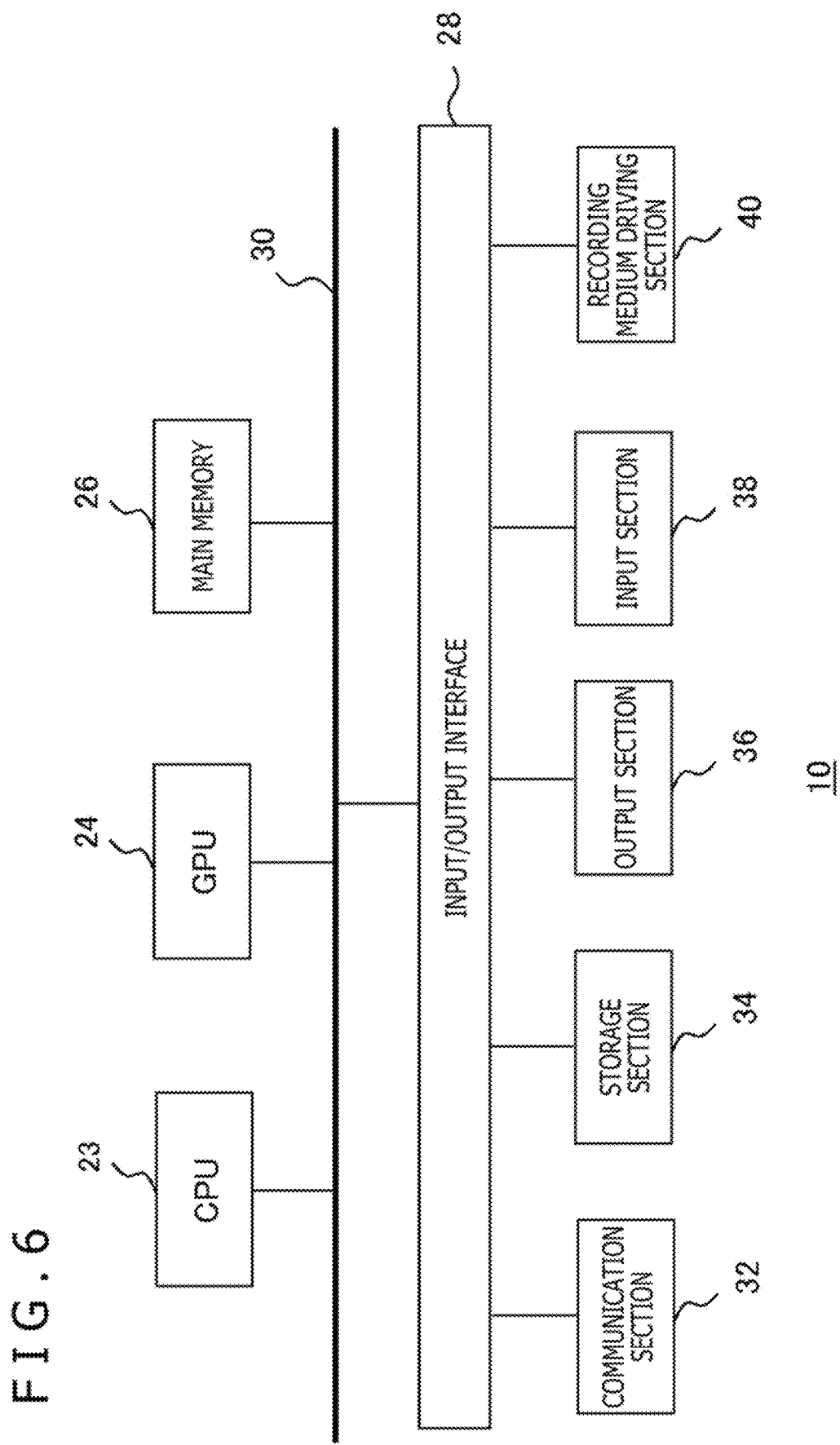
FIG. 6 is a diagram illustrating an internal circuit configuration of an information processing apparatus in the present embodiment.

FIG. 6 illustrates an internal circuit configuration of the information processing apparatus 10. The information processing apparatus 10 includes a central processing unit (CPU) 23, a graphics processing unit (GPU) 24, and a main memory 26. These sections are connected to each other via a bus 30. An input/output interface 28 is further connected to the bus 30. A communication section 32, a storage section 34, an output section 36, an input section 38, and a recording medium driving section 40 are connected to the input/output interface 28. The communication section 32 includes a peripheral equipment interface such as universal serial bus (USB) or IEEE (Institute of Electrical and Electronic Engineers) 1394 and a wired or wireless LAN network interface. The storage section 34 includes a hard disk drive or a non-volatile memory. The output section 36 outputs data to the display apparatus 16. The input section 38 receives data input from the imaging apparatus 12 and an input apparatus that is not illustrated. The recording medium driving section 40 drives a removable recording medium such as a magnetic disk, an optical disc, or a semiconductor memory.

The CPU 23 controls the information processing apparatus 10 as a whole by executing an operating system stored in the storage section 34. The CPU 23 also executes various programs read out from the removable recording medium and loaded into the main memory 26 or downloaded via the communication section 32. The GPU 24 has a geometry engine function and a rendering processor function, performing a drawing process in accordance with a drawing instruction from the CPU 23 and storing display image data in a frame buffer that is not illustrated. Then, the GPU 24 converts the display image stored in the frame buffer into a video signal, outputting the signal to the output section 36. The main memory 26 includes a random access memory (RAM) and stores programs and data required for processing.

Figure 7:
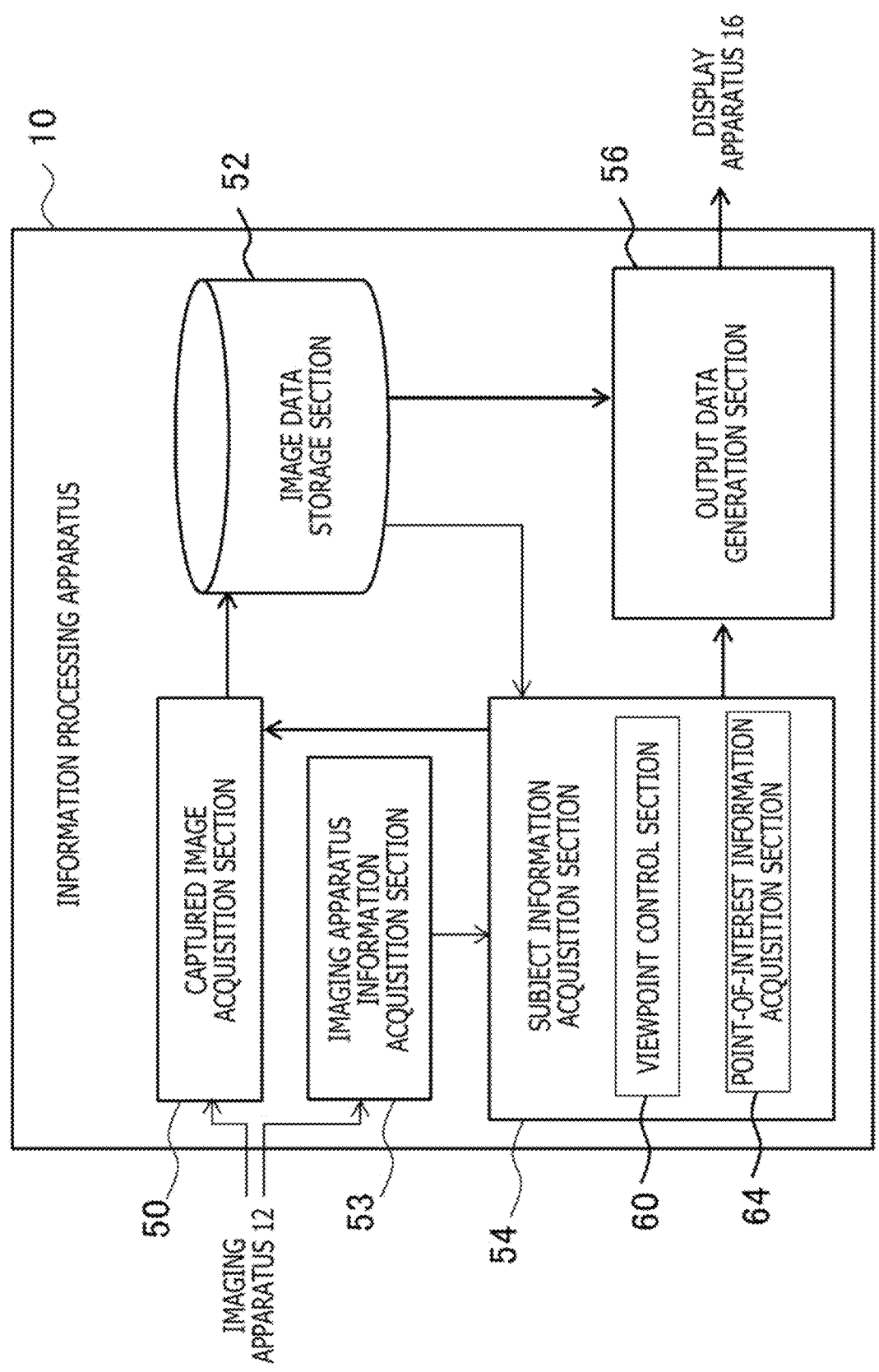
FIG. 7 is a diagram illustrating a functional block configuration of the information processing apparatus in the present embodiment.

FIG. 7 illustrates a functional block configuration of the information processing apparatus 10 of the present embodiment. Each element recited as a functional block for performing various processing tasks in FIG. 7 can be configured by hardware such as various circuits including the CPU 23, the GPU 24, and the main memory 26 illustrated in FIG. 6 and can be realized by software such as programs loaded into the main memory 26 from the recording medium driven by the recording medium driving section 40 and the storage section 34. Therefore, it is understood by a person skilled in the art that these functional blocks can be realized in various ways including hardware alone, software alone, and a combination thereof, and the functional blocks are not limited to any one of them.

The information processing apparatus 10 includes a captured image acquisition section 50, an image data storage section 52, an imaging apparatus information acquisition section 53, a subject information acquisition section 54, and an output data generation section 56. The captured image acquisition section 50 acquires captured image data from the imaging apparatus 12. The image data storage section 52 stores acquired image data. The imaging apparatus information acquisition section 53 acquires position and posture information of the imaging apparatus 12. The subject information acquisition section 54 acquires information regarding the normal and shape of the subject on the basis of the captured image. The output data generation section 56 generates data to be output on the basis of subject state information.

The captured image acquisition section 50 is realized by the input section 38, the CPU 23, and the like in FIG. 6 and acquires captured image data including polarization images, captured from a plurality of viewpoints, from the imaging apparatus 12. At this time, the captured image acquisition section 50 acquires, as the polarization images, images with polarization luminance in at least three azimuths per viewpoint. In the case where an image sensor having a polarizer layer including polarizers oriented in a plurality of directions as described above is introduced in particular, video data whose image frames are polarization images including information in a plurality of azimuths may be acquired. At this time, video data that is captured while the viewpoint is continuously moved at the same time may be acquired.

Alternatively, still image data captured separately from two or more viewpoints may be acquired. Still alternatively, a plurality of stationary cameras having different viewpoints may be used as the imaging apparatus 12, so that still images or video data captured by each camera is acquired. Depending on the purpose of information processing and the details of image analysis as in a case where a captured image is displayed on the display apparatus 16, the captured image acquisition section 50 may further acquire common color captured image data. The captured image acquisition section 50 stores acquired captured image data in the image data storage section 52.

It should be noted that in the case where a single image frame includes polarization information in a plurality of azimuths, the captured image acquisition section 50 generates polarization images in a plurality of azimuths by separating and interpolating, as appropriate, pixel values for each polarization azimuth first and then stores the polarization images in the image data storage section 52. The imaging apparatus information acquisition section 53 is realized by the input section 38, the CPU 23, and the like in FIG. 6 and acquires a position and posture of the imaging apparatus 12 in a real space at least when the polarization images are captured. Typically, the imaging apparatus information acquisition section 53 derives, in given time steps, the position and posture of the imaging apparatus 12 on the basis of measured values such as acceleration and angular velocity measured by motion sensors incorporated in the imaging apparatus 12.

Alternatively, the position and posture of the imaging apparatus 12 may be derived by an image analysis technique such as simultaneous localization and mapping (SLAM) on the basis of captured images acquired by the captured image acquisition section 50. These techniques are widely known. Therefore, the description thereof is omitted. The subject information acquisition section 54 is realized by the CPU 23, the GPU 24, and the like in FIG. 6 and acquires a normal vector and position coordinates of a point of interest on the subject in the world coordinate system by using the polarization image data stored in the image data storage section 52 and position and posture information of the imaging apparatus 12 acquired by the imaging apparatus information acquisition section 53. The subject information acquisition section 54 may acquire the shape and posture of the subject by treating a set of points of interest as a subject's surface.

In more details, the subject information acquisition section 54 includes a viewpoint control section 60 and a point-of-interest information acquisition section 64. The viewpoint control section 60 performs control such that polarization images are captured from suitable viewpoints by using position and posture information of the imaging apparatus 12. In a mode where the user moves the imaging apparatus 12 by holding or wearing it, the viewpoint control section 60 determines a polarization image captured from a certain viewpoint as a reference and notifies the user of the direction in which the viewpoint moves in subsequent image captures. The notification may be made by displaying an image on the display apparatus 16 or producing a sound via the output data generation section 56.

In the present embodiment, a normal and position coordinates are derived in the world coordinate system by using incident planes obtained for a plurality of viewpoints and a line of sight to a point of interest as described above. At this time, the farther the other viewpoint is from the incident plane of one of the viewpoints, the less likely it is for a computation result to include error. Therefore, the viewpoint control section 60 guides the viewpoint in the direction away from the incident plane of the former viewpoint, and by extension, in the direction of bringing the incident plane closer to 90° on condition that the point of interest remains within the field of view. Then, a polarization image captured when an appropriate viewpoint is acquired is used as a target image to be analyzed. At this time, the user may capture a still image in response to a shutter timing notified by the viewpoint control section 60. Alternatively, the viewpoint control section 60 may extract an image frame from an appropriate viewpoint from among a series of pieces of video image data.

It should be noted that the present embodiment is not limited to a mode where the user moves the imaging apparatus 12, and a plurality of imaging apparatuses may be fixed in position at an appropriate viewpoint as described above. Alternatively, a mechanism whose position and posture can be controlled by the viewpoint control section 60 may be provided in the imaging apparatus 12. It should be noted, however, that the present embodiment permits acquisition of subject state information by using images captured from a small number of viewpoints such as two viewpoints. Therefore, even the mode where the user moves the imaging apparatus 12 does not involve much labor and, moreover, keeps installation cost to a minimum. Hereinafter, a viewpoint from which a reference polarization image is captured will be referred to as a "first viewpoint," and a viewpoint having an appropriate positional relation with the first viewpoint in terms of analysis will be referred to as a "second viewpoint." It should be noted that there may be only one second viewpoint or two or more second viewpoints.

The point-of-interest information acquisition section 64 sets a pixel of interest for a polarization image captured from the first viewpoint and acquires an incident plane on the basis of azimuth dependence of polarization luminance in the pixel of interest. Here, the term "pixel of interest" refers to a pixel obtained by projecting a point of interest on a subject in a three-dimensional space onto an image plane. That is, this process is nothing but setting a point of interest on the subject and determining an incident plane at the point of interest relative to the first viewpoint. As pixels of interest, pixels whose degree of polarization is equal to or higher than a threshold are selected as described above. The acquired incident plane is used by the viewpoint control section 60 to control second viewpoints.

The point-of-interest information acquisition section 64 further acquires an incident plane at a pixel representing the same point of interest on the subject for a polarization image captured from the second viewpoint. Here, in the polarization image captured from the second viewpoint, the pixel position representing the same point of interest as set by using the first viewpoint image is unknown unless, for example, there is an obvious feature point. For this reason, the point-of-interest information acquisition section 64 projects the line-of-sight vector from the first viewpoint to the point of interest onto the image plane of the second viewpoint, acquiring normal vectors of the subject on a straight line thereof. Then, the reliability level of each normal vector is evaluated by use of the relation between the zenith angle and the degree of polarization, thus identifying a pixel representing the same point of interest.

This makes it possible to identify a corresponding pixel of interest on the image plane imaged from the second viewpoint and acquire a normal vector of the point of interest at the same time. It should be noted that these processes may be performed in parallel for a plurality of points of interest. The point-of-interest information acquisition section 64 may further evaluate the normal vectors acquired in this manner according to a given criterion and assign a reliability level. In the case where the reliability level is lower than a given threshold, the normal vector in question may be excluded from the output result. Alternatively, each normal vector may be output in association with a reliability level.

Further, the point-of-interest information acquisition section 64 extends, as necessary, the line of sight from each viewpoint to the pixel of interest on the image plane, thus acquiring an intersection thereof as position coordinates of the point of interest. Also in this case, data to be output is screened on the basis of the reliability level acquired for the corresponding normal vector or is associated with a reliability level and output.

The output data generation section 56 is realized by the CPU 23, the GPU 24, the output section 36, and the like in FIG. 6 and outputs subject state information acquired by the subject information acquisition section 54 or generates and outputs data representing results of a given information processing task performed on the basis of the subject state information. For example, in the case where a real object existing in a subject space is replaced with a virtual object or a virtual object is drawn that interacts with a real object, the output data generation section 56 creates, as an initial process of such a usage, an environmental map obtained by modeling a real space and outputs the map. At this time, the map may be output to a storage apparatus such as the main memory 26.

Alternatively, the output data generation section 56 may perform a given information processing task such as game by using output data of the subject information acquisition section 54 and output a display image or sound data representing the result thereof to the display apparatus 16. At this time, the output data generation section 56 may use, for example and as appropriate, natural light captured images stored in the image data storage section 52. It is understood by a person skilled in the art that various information processing tasks can be realized by using normals and shapes of real objects.

Figure 8:
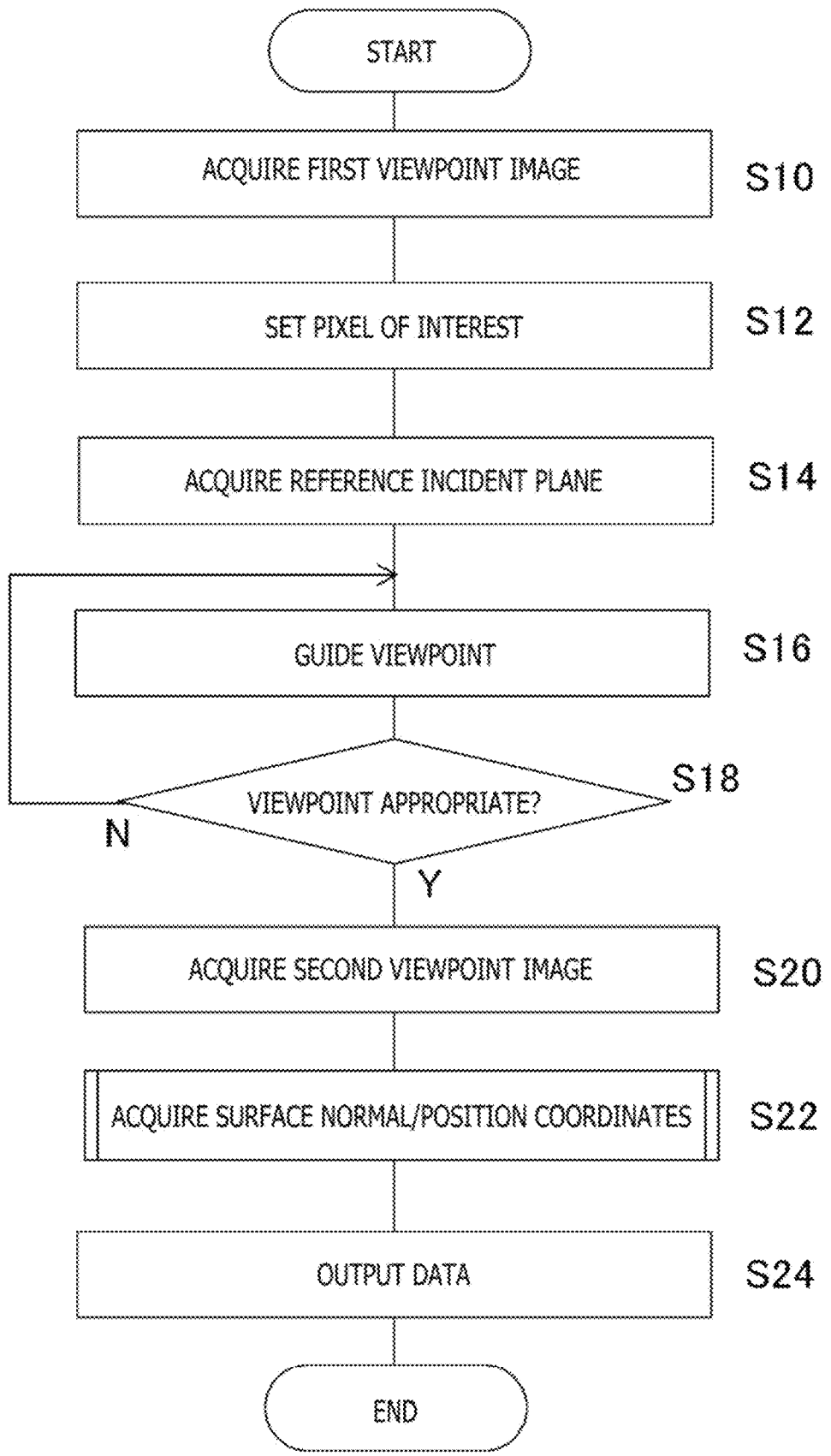
FIG. 8 is a flowchart illustrating a processing procedure for the information processing apparatus to acquire subject state information by using a polarization image in the present embodiment.

A description will be given next of operation of the information processing apparatus 10 that can be realized by the configuration described above. FIG. 8 is a flowchart illustrating a processing procedure for the information processing apparatus 10 to acquire subject state information by using a polarization image. This flowchart assumes that the user moves the viewpoint by moving the imaging apparatus 12. Also, the procedure progresses in parallel with the acquisition of information regarding the position and posture thereof by the imaging apparatus information acquisition section 53 and the acquisition of captured image data by the captured image acquisition section 50 after the information processing apparatus 10 has established communication with the imaging apparatus 12.

The viewpoint control section 60 of the subject information acquisition section 54 acquires image data from a first viewpoint first (S10). At this time, a still image captured from a certain viewpoint may be used in an 'as-is' fashion as a first viewpoint image. Alternatively, of a video captured continuously from varying viewpoints, an image frame extracted by the viewpoint control section 60 may be selected as a first viewpoint image.

Next, the point-of-interest information acquisition section 64 sets a pixel of interest for the first viewpoint polarization image (S12). Specifically, the point-of-interest information acquisition section 64 approximates a change in polarization luminance to Formula 1 for each pixel of the polarization image first and selects those pixels whose degree of polarization obtained from Formula 2 is equal to or higher than the threshold $Th_\rho$ as pixels of interest. It should be noted that the purpose is not to select all such pixels as pixels of interest. Instead, only a silhouette region of a target object may be selected. Alternatively, only those pixels at given intervals of the region may be selected. Still alternatively, only a single pixel may be selected as a pixel of interest. In the case where a single pixel of interest is set, the pixel that provides the highest degree of polarization may be selected rather than a decision based on a threshold.

Further, the point-of-interest information acquisition section 64 obtains an incident plane (reference incident plane) relative to the first viewpoint from the phase angle $\psi$ obtained by approximation to Formula 1 for each pixel of interest (S14). As a result of selection of pixels whose degree of polarization is large as pixels of interest, $\psi$−90° is acquired as an incident plane angle by applying a specular reflection model. By using the first viewpoint information in the world coordinate system, i.e., position and posture information of the imaging apparatus 12, it is possible to define a plane having $\psi$−90° relative to the viewpoint in question in the world coordinate system.

Next, the viewpoint control section 60 guides the viewpoint of the imaging apparatus 12 in such a manner as to acquire a second viewpoint in an appropriate manner (S16). Here, the term "appropriate viewpoint" refers, as described above, to a viewpoint where the point of interest on the subject represented by the pixel of interest set in S12 is within the field of view and where the angle formed between the incident planes is sufficient. It should be noted, however, that the point of interest and the position of a silhouette thereof are unknown at this point in time. Therefore, it is impossible to precisely acquire incident planes relative to the second viewpoint. For this reason, the angle formed between the incident planes is, for example, approximated by the angle formed by an optical axis relative to the incident plane of the first viewpoint.

In the case where a normal vector is obtained from two incident planes corresponding to two viewpoints, it is desirable that the angle formed by the incident planes should be close to 90°. Meanwhile, in the case where a normal vector is obtained from incident planes corresponding to three or more viewpoints, it is desirable that the maximum angle formed by two incident planes should be close to 90° and that other incident planes should be acquired by an angle obtained by evenly dividing the angle in question. Therefore, an appropriate threshold for the optical axis angle is set in advance to suit the number of viewpoints for a captured image to be used for analysis. Alternatively, the aptitude may be simply decided by using the viewpoint positions. In this case, for example, a viewpoint is determined to be appropriate when the distance from the incident plane of the first viewpoint is equal to or higher than a threshold.

While the viewpoint fails to meet a condition for an appropriate viewpoint (N in S18), the viewpoint control section 60 continues to guide the viewpoint (S16). When the condition is met (Y in S18), the viewpoint control section 60 selects a polarization image captured at that time as a second viewpoint image (S20). It should be noted that in the case where images captured from three or more viewpoints are used, the processes in S16 to S20 are repeated. The number of viewpoints for polarization images used for processing is set properly on the basis of required accuracy, processing capability of the information processing apparatus 10, time permitted for processing, and the like.

Next, the point-of-interest information acquisition section 64 acquires an incident plane at the same point of interest by using the polarization image captured from the second viewpoint first and then derives a normal vector of the point of interest by obtaining a line of intersection with the incident plane of the first viewpoint. Further, the point-of-interest information acquisition section 64 derives position coordinates of the point of interest by obtaining an intersection of line-of-sight vectors, each from one of the viewpoints to the point of interest (S22). In this process, the normal vector is evaluated in terms of reliability level in accordance with a condition at the time of derivation of the normal vector, consistency with surrounding results, and the like, followed by screening as appropriate and assignment of a reliability level.

The point-of-interest information acquisition section 64 supplies, to the output data generation section 56, a normal vector and position coordinates in the world coordinate system in association with a reliability level as appropriate for each point of interest on the subject. The output data generation section 56 generates data representing results themselves or output data resulting from processes such as games and image drawing by using the data and outputs the data (S24). In the case where an image processing task is performed by using subject state information, it is possible to screen values used for the information processing task or adjust an impact of the reliability level, a weight, on processing results.

Figure 9:
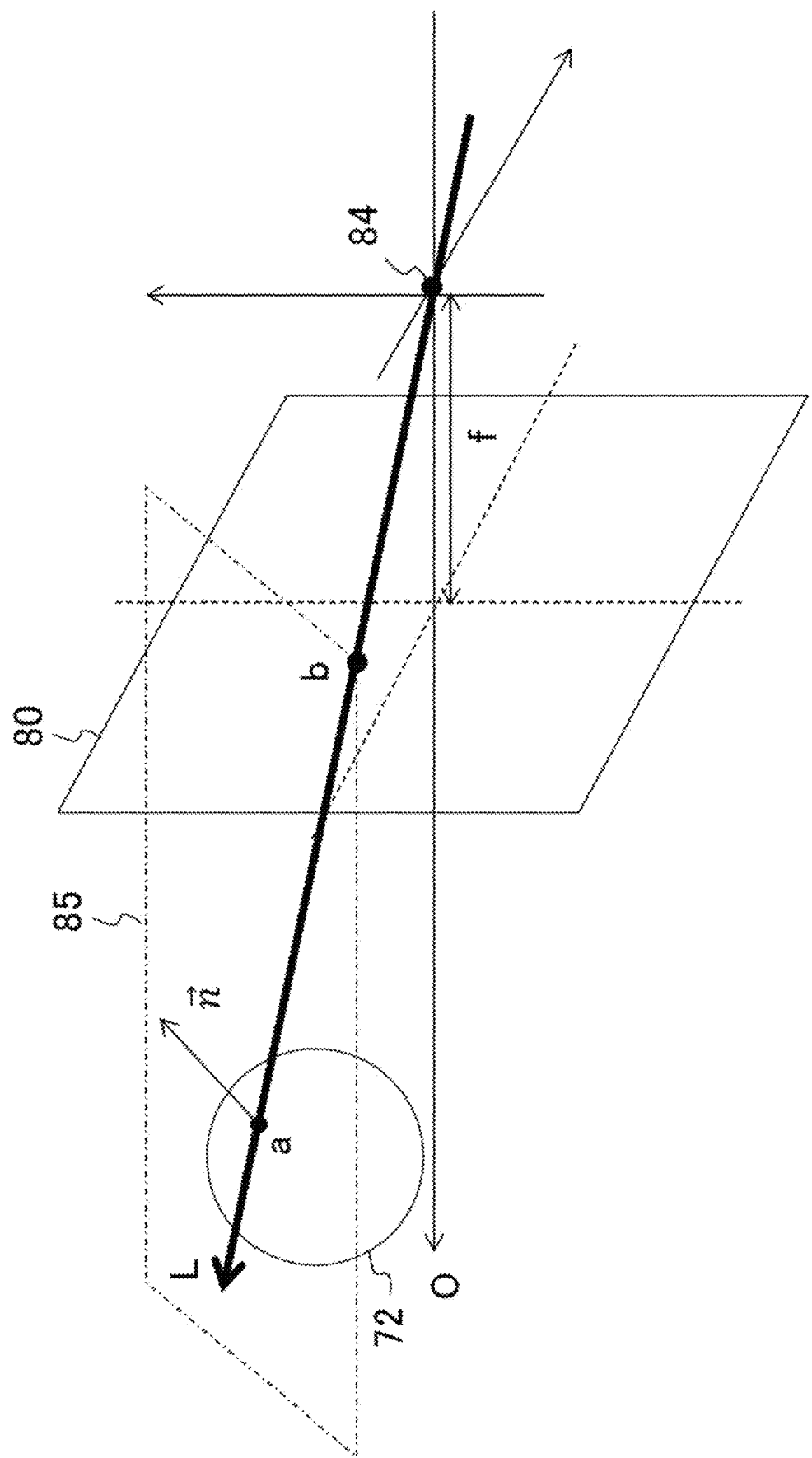
FIG. 9 is a diagram schematically illustrating a positional relation between a viewpoint of the imaging apparatus, a point of interest on a subject, and a pixel of interest on a captured image in the present embodiment.

FIG. 9 schematically illustrates a positional relation between a viewpoint of the imaging apparatus 12, a point of interest on a subject, and a pixel of interest on a captured image. According to the common central projection type imaging apparatus 12 assumed in the present embodiment, a silhouette of the point of interest 'a' on the subject 72 is projected onto an intersection b between a straight line L connecting a viewpoint 84 of the imaging apparatus 12 and the point of interest 'a' and a plane 80 of the captured image. Here, the plane 80 of the captured image is vertical to the optical axis at a position a focal distance f away from the viewpoint 84 toward an optical axis O, and the size thereof is determined by a viewing angle of the imaging apparatus 12. In the present embodiment, we assume that internal parameters of the imaging apparatus 12 such as the focal distance f and the viewing angle are acquired in advance.

As the imaging apparatus information acquisition section 53 acquires the position and posture of the imaging apparatus 12, the position coordinates of the viewpoint 84 and an orientation of the optical axis O become known. Therefore, the plane 80 of the captured image can be defined in the world coordinate system. Considering the projection relation described above, even if the position coordinates of the point of interest 'a' on the subject are unknown, the straight line L where the point of interest 'a' can exist is uniquely determined by giving the position coordinates of the point on the plane 80 of the captured image onto which the point of interest 'a' is projected, i.e., the pixel of interest b. Hereinafter, a vector from the viewpoint 84 of the imaging apparatus 12 toward the point of interest 'a' will be referred to as a line-of-sight vector.

Meanwhile, the phase angle ψ and the degree of polarization ρ are obtained for each pixel on the plane 80 from Formulas 1 and 2 on the basis of azimuth dependence of polarization luminance. The selection of a point whose degree of polarization ρ is equal to or higher than a given threshold as the pixel of interest b allows for ψ−90°, the angle of the incident plane 85, to be obtained from the phase angle ψ by applying a specular reflection model. The incident plane 85 in question is a plane that includes the line-of-sight vector L and the normal vector n of the point of interest 'a.' Because the plane 80 of the captured image has been acquired in the global coordinate system, the incident plane 85 is also defined in the world coordinate system.

Figure 10:
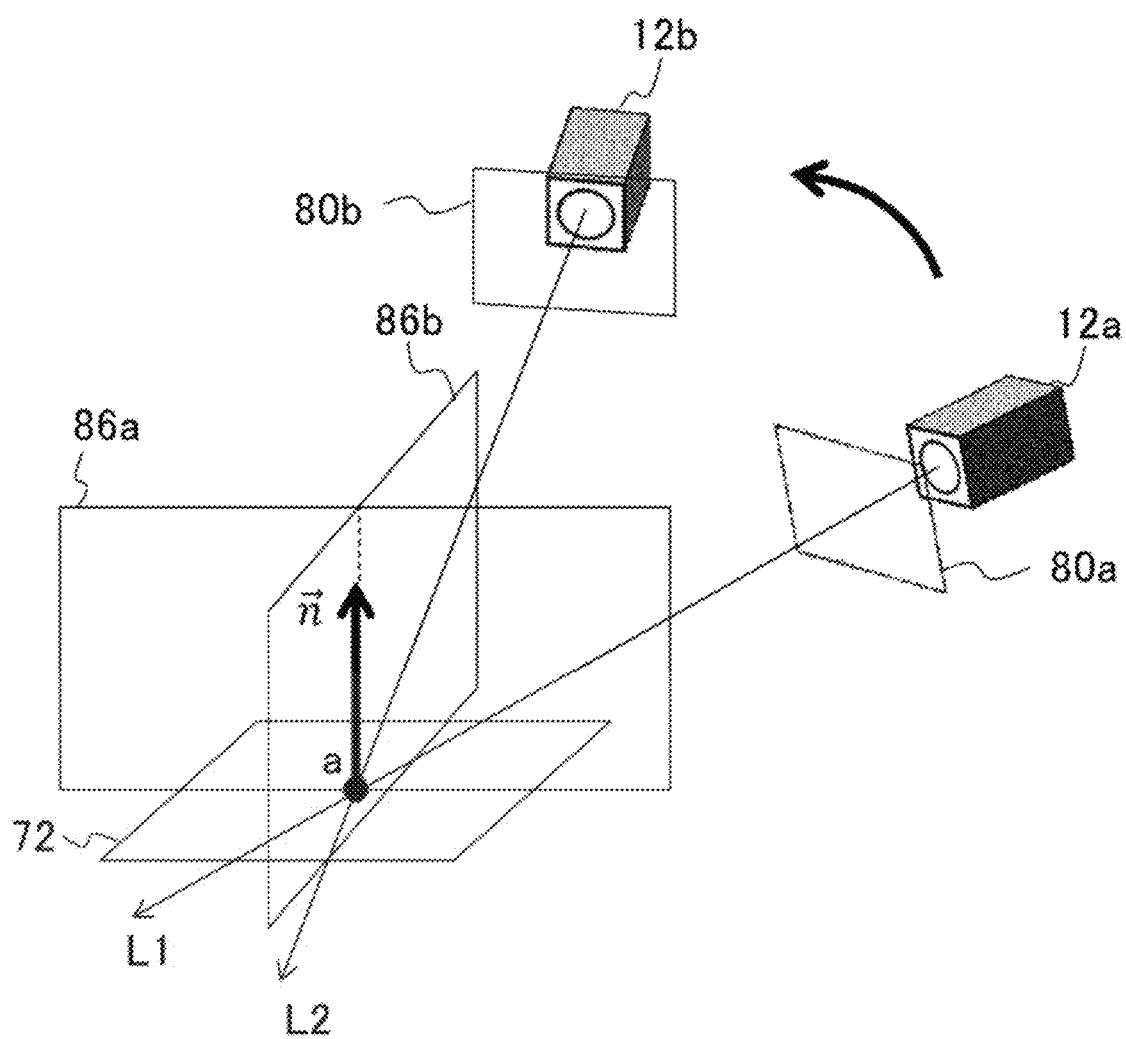
FIG. 10 is a diagram schematically illustrating a manner in which a normal at the point of interest is acquired from incident planes corresponding to a plurality of viewpoints in the present embodiment.

FIG. 10 schematically illustrates a manner in which a normal at a point of interest is acquired from incident planes corresponding to a plurality of viewpoints. Here, the viewpoints of imaging apparatuses 12*a* and 12*b* are assumed to be first and second viewpoints, respectively. First, at the first viewpoint, an incident plane 86*a* acquired for the point of interest 'a' on the subject 72 includes a line-of-sight vector L1 toward the point of interest 'a' and the normal vector n of the point of interest 'a.' Here, if an incident plane 86*b* is obtained in the same manner after moving the imaging apparatus 12 to the second viewpoint, the normal vector n agrees with a line of intersection between the incident plane 86*a* and the incident plane 86*b*. Also, an intersection between a line-of-sight vector L2 at this time and the line-of-sight vector L1 from the first viewpoint agrees with the point of interest 'a.'

Here, the larger the angle between the line-of-sight vector L1 and the line-of-sight vector L2 corresponding to two viewpoints, and more precisely, the closer the angle formed by the line-of-sight vector L2 of the second viewpoint and the incident plane 86*a* of the first viewpoint to 90°, the better noise immunity, and as a result, the higher the accuracy of the normal vector n and the position coordinates of the point of interest 'a.' For this reason, the viewpoint control section 60 presents, to the user, information regarding a proper direction in which to move the viewpoint and a direction in which to orient the lens as described above.

Figure 11:
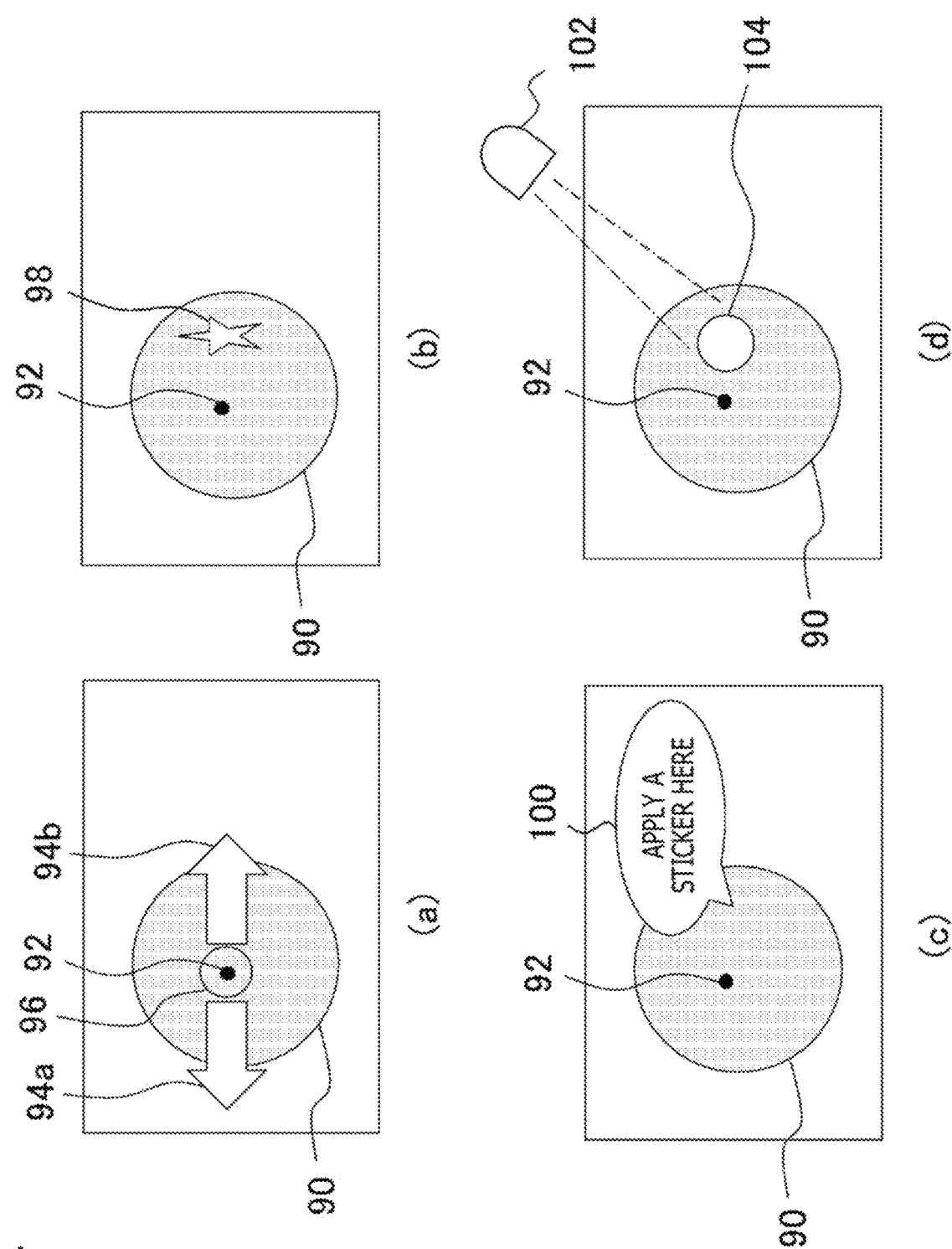
FIG. 11 depicts diagrams each illustrating an example of a screen displayed on a display apparatus via an output data generation section for a viewpoint control section to guide a viewpoint of the imaging apparatus in the present embodiment.

FIG. 11 depicts diagrams each illustrating an example of a screen displayed on the display apparatus 16 via the output data generation section 56 for the viewpoint control section 60 to guide the viewpoint of the imaging apparatus 12. The rectangle depicted in each of (a), (b), (c), and (d) represents a screen displayed when a capture is made with the first viewpoint, and a captured image from the first viewpoint is illustrated as a base. In this example, an image of a spherical subject 90 is captured. The same figure also depicts that a pixel of interest 92 is set on a silhouette of a subject 90. However, this may not be actually displayed.

The viewpoint control section 60 guides the viewpoint such that the pixel of interest 92 set on the first viewpoint captured image remains within the field of view and that the angle formed between the incident planes approaches 90° as described above. In the example of (a), a circle 96 surrounding the pixel of interest 92 and arrows 94*a* and 94*b* starting from the circle 96 and pointing leftward and rightward, respectively, are displayed in a superimposed manner on the captured image. The directions of the arrows point away from the incident plane of the first viewpoint and do not necessarily point leftward or rightward as illustrated. With the arrows 94*a* and 94*b* displayed in a superimposed manner, for example, guidance, in text or voice, is provided saying "Move the camera in one of the directions indicated by the arrows while keeping the circle near the center of the screen."

While the user moves the imaging apparatus 12 in either direction in accordance with the guidance, the appearance of the subject space captured by the imaging apparatus 12, the arrows displayed in a superimposed manner, and the like are continuously displayed. For example, the circle 96 indicating the pixel of interest may be made to look as if it is affixed on the subject 90 by moving the circle 96 in the direction opposite to the direction of movement of the viewpoint of the imaging apparatus 12. The movement of the viewpoint can be identified on the basis of position and posture information of the imaging apparatus 12 acquired by the imaging apparatus information acquisition section 53. As the viewpoint approaches an appropriate one, a message to this effect may be made clear, for example, by shortening the arrow in the corresponding direction.

In the case of (b), a feature point such as a pattern 98 actually existing on the subject is used. That is, once the pixel of interest 92 is set, a feature point that is sized to be visible by the user and has a sufficient difference in color from surrounding areas is detected in the vicinity thereof and in the direction of movement toward the appropriate viewpoint. A common edge detection technique or a common pattern matching technique can be used for extraction. Then, the viewpoint is guided to move toward the detected feature point, for example, by providing text or voice guidance saying "Move the camera such that the yellow star pattern is placed at the front center."

An arrow may be displayed near the feature point in a superimposed manner to indicate where the feature point is located. While the user moves the imaging apparatus 12 in accordance with the guidance, the appearance of the subject space captured by the imaging apparatus 12 is continuously displayed. This allows the user to adjust the viewpoint by confirming the actual angle.

In the case of (c), the subject is marked on the spot, and the marking is used as a feature point. That is, once the pixel of interest 92 is set, graphics is displayed in a superimposed manner indicating the position a given length away in the direction of movement toward the appropriate viewpoint, and moreover, a text or voice instruction is given to mark the subject surface at that position. In the example illustrated, a speech bubble 100 indicating a text saying "Apply a sticker here" is displayed in a superimposed manner. In order to temporarily mark the subject, thin objects that do not affect the subject shape much such as pieces of paper or stickers whose color, shape, and size are easy to distinguish from surrounding areas are made available separately in advance. Depending upon the subject material, a marking may be drawn directly on the subject with an erasable pen.

Also in this mode, text or voice guidance is provided, at the time of application of the marking, saying "Move the camera such that the sticker is placed at the front center," thus guiding the viewpoint to move toward the marking. While the user moves the imaging apparatus 12, the appearance of the subject space captured by the imaging apparatus 12 is continuously displayed. It should be noted that, although an instruction is given to apply a sticker to a single location in the example illustrated, the two directions of movement to the appropriate viewpoint may be both specified, thus allowing the user to choose the more convenient of the two for marking.

In the example of (d), a light beam shining device 102 such as laser pointer that can be controlled by the viewpoint control section 60 is made available in the real space in advance, and a light beam is shone onto the position a given length away in the direction of movement toward the appropriate viewpoint. This allows a shining pattern 104 to be formed on the subject. Moreover, for example, text or voice guidance is provided saying "Move the camera such that the shining pattern is placed at the front center," thus guiding the viewpoint to move toward the shining pattern 104. In this case, the viewpoint control section 60 switches on or off the shining device and adjusts the shining position. Alternatively, the shining device may be provided on the side of the imaging apparatus 12 and controlled by the viewpoint control section 60.

When a polarization image is captured from the appropriate viewpoint as a result of viewpoint guidance described above, the point-of-interest information acquisition section 64 obtains an incident plane for the pixel of interest representing the same point of interest on the subject in polarization images captured from a plurality of viewpoints on the basis of azimuth dependence of polarization luminance as illustrated in FIG. 10. Here, in the case where the position of the point of interest on the subject is unknown, a silhouette of the point of interest in question in the second viewpoint captured image, i.e., where the pixel of interest is located, is unknown. For this reason, the point-of-interest information acquisition section 64 repeatedly derives a normal vector, thus searching for a correct pixel of interest on the second viewpoint captured image.

Figure 12:
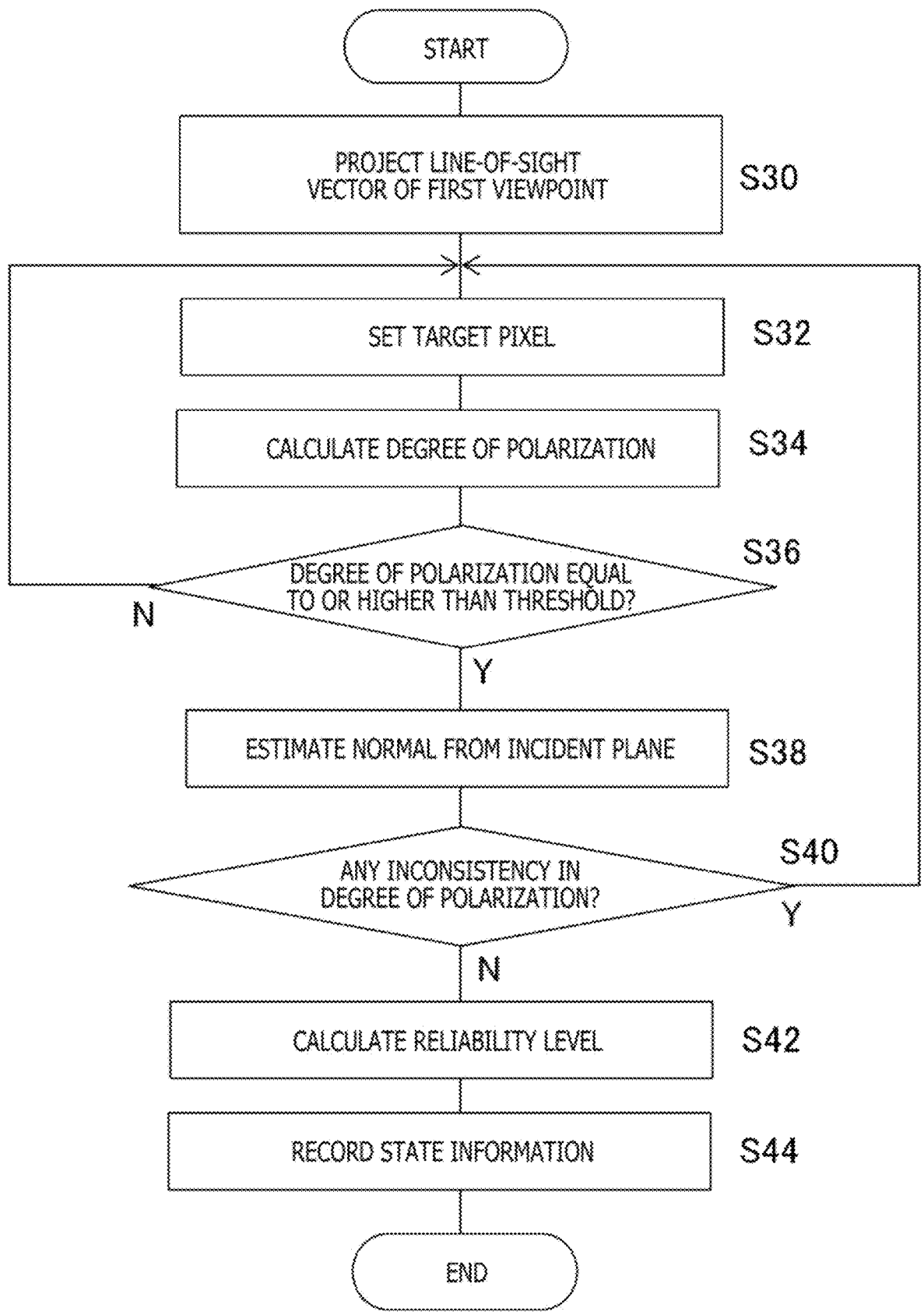
FIG. 12 is a flowchart illustrating a processing procedure for a point-of-interest information acquisition section to acquire subject state information in S22 in FIG. 8.

FIG. 12 is a flowchart illustrating a processing procedure for the point-of-interest information acquisition section 64 to acquire subject state information in S22 in FIG. 8. First, the point-of-interest information acquisition section 64 projects the line-of-sight vector L1 from the first viewpoint to the point of interest onto the plane of the second viewpoint captured image. As illustrated in FIG. 9, the pixel of interest b is set in the plane 80 of the captured image of the first viewpoint 84, thus allowing a line-of-sight vector L thereof to be uniquely determined in a three-dimensional space. Meanwhile, an image plane 80b of the second viewpoint is obtained from the position and posture of the imaging apparatus 12b at that time as illustrated in FIG. 10. As a result, the line-of-sight vector L1 from the first viewpoint can be represented as a straight line on the image plane 80b of the second viewpoint.

FIG. 13 schematically illustrates a manner in which the line-of-sight vector L1 from the first viewpoint is projected onto the image plane of the second viewpoint. As described above, the point of interest on the subject is located at any one of the positions on the line-of-sight vector L1 from the first viewpoint. For this reason, the point-of-interest information acquisition section 64 searches for a correct pixel of interest on the straight line obtained by projecting the line-of-sight vector L1 onto the image plane 80b of the second viewpoint.

The same figure illustrates, by angular directional arrows, the manner in which phase angles $\psi1$, $\psi2$, $\psi3$, and $\psi4$ are obtained from azimuth dependence of polarization luminance for pixels p1, p2, p3, and p4 on the straight line representing the line-of-sight vector L1. Basically, the reliability level of a normal vector obtained in the case where these pixels are assumed to be pixels of interest is evaluated, thus determining the pixel that provides the most probable normal vector as a pixel of interest and the normal vector in question as a normal vector of the point of interest.

Referring back to FIG. 12, the point-of-interest information acquisition section 64 sets, as a target, a certain pixel on the straight line obtained by projecting the line-of-sight vector L1 (S32) and obtains the degree of polarization $\rho$ by using Formulas 1 and 2 on the basis of the polarization luminance at that position (S34). In S12 in FIG. 8, a pixel where specular reflection is predominant is selected when the pixel of interest is set for the first viewpoint image. The degree of polarization is dependent upon the zenith angle. Therefore, in the case where the second viewpoint is varied primarily in an azimuthal direction, it is probable that the degree of polarization is also equal to or higher than the given value also at the pixel of interest in the second viewpoint image. Therefore, no more calculations are performed for those pixels whose degree of polarization $\rho$ is smaller than the threshold by determining that these pixels are not corresponding pixels (N in S36).

In this case, a next pixel is set as a target on the projected straight line, and the degree of polarization is estimated similarly (S32 to S36). It should be noted that the term "next pixel" may be an adjacent pixel on the projected straight line or a pixel located at a given spacing as illustrated in FIG. 13. Also, the threshold used as a decision criterion in S36 may be the same as or different from the one used when a pixel of interest is set for the first viewpoint image in S12 in FIG. 8.

If the degree of polarization is equal to or higher than the threshold (Y in S36), the phase angle $\psi$ is obtained by Formula 1, followed by calculation of the incident plane angle with a specular reflection model and obtaining of a line of intersection with the incident plane acquired relative to the first viewpoint, thus estimating the normal vector n as illustrated in FIG. 10 (S38). It should be noted, however, that we do not know whether the incident plane of the point of interest has been acquired properly. For this reason, the reliability level of the acquired normal vector is evaluated on the basis of the relation between the degree of polarization and the zenith angle (S40).

Specifically, the degree of polarization theoretically acquired from the zenith angle determined from an estimated normal vector is compared with the degree of polarization actually obtained from Formulas 1 and 2, and if it is concluded that there is no inconsistency, the estimated normal vector is determined to be correct (N in S40). In this case, the point-of-interest information acquisition section 64 calculates a reliability level for the normal vector in question first (S42) and records them in association with each other in the main memory or the like (S44). Here, the term "reliability level" may be a function obtained in the decision process of S40 where the smaller the difference between the theoretical degree of polarization and the actual degree of polarization, the larger the value. Alternatively, a new reliability level may be calculated from a point of view different from a degree of polarization.

For example, in the case where a plurality of points of interest are set on the same subject, the reliability level is calculated on the basis of dispersion of the normal vectors acquired for the points of interest within a given range. Alternatively, the refractive index η of the subject is obtained by substituting the zenith angle θ determined by the normal vector and the degree of polarization ρ determined by Formula 2 into Formula 3, after which the reliability level is calculated on the basis of dispersion thereof. In either case, a possible approach would be to derive an increase in dispersion resulting from a newly acquired normal vector and calculate a reliability level with a function where the larger the increase, the smaller the value.

Meanwhile, if it is concluded in S40 that there is inconsistency such as a difference greater than the threshold between the theoretical degree of polarization and the actually acquired degree of polarization (Y in S40), a next pixel is set as a target on the projected straight line and similar processes are repeated by deciding that the estimated normal vector is not correct (S32 to S40). It should be noted that in the case where there is inconsistency in degree of polarization for all the pixels on the projected straight line such as in the case where the second viewpoint is not appropriate, the process may be terminated at that point in time (not depicted). According to the above processes, it is possible to simultaneously acquire a true pixel of interest on the image plane of the second viewpoint, the true pixel of interest corresponding to the point of interest on the subject, and a normal vector of the point of interest in question regardless of the position of the point of interest in the world coordinate system.

It should be noted that, in the flowchart illustrated in FIG. 12, if a certain pixel provides a highly reliable normal vector for a point of interest, the process is terminated after recording the normal vector. This makes it possible to save time required for processing. Meanwhile, the most reliable normal vector may be selected and recorded by performing the processes from S34 to S40 or to S42 on all the target pixels on the straight line obtained by projecting the line-of-sight vector L1 onto the image plane.

In this case, of the pixels sampled at given intervals on the straight line obtained by projecting the line-of-sight vector L1, the most reliable pixel or that with a reliability level equal to or higher than the threshold may be extracted, followed by sampling of the pixels within a given range around that location with more density for reevaluation of the reliability level. The number of times the processes are repeated by varying the density of pixels to be sampled may be fixed, or the number of times the probability of acquiring a higher reliability level than a previous sampling becomes equal to or higher than a threshold may be determined adaptively through statistical processing of a reliability level distribution. Also in this case, the most reliable normal vector is selected through processing and recorded.

Also in the description given above, of the lines of intersection of the incident planes from two viewpoints, a highly reliable line is selected as a normal vector. As described above, a correct pixel of interest in the second viewpoint image is simultaneously determined at this time. It is possible, by taking advantage of this, to identify the second line-of-sight vector L2 that is directed from the second viewpoint toward the point of interest on the subject through the pixel of interest in question. For this reason, the position coordinates of the point of interest 'a' on the subject in the world coordinate system may be further obtained and recorded in the main memory or the like in S44 by obtaining the intersection with the first viewpoint line-of-sight vector L1 as illustrated in FIG. 10. In this mode, the dispersion of the position coordinates in question may be used as a reliability level calculated in S42. Also in this case, it is only necessary to derive the increase in dispersion resulting from the newly acquired position coordinates and calculate the reliability level with a function where the larger the increase, the smaller the value.

Also, in the case where captured images from N (where N is a natural number equal to or larger than 2) viewpoints, the illustrated flowchart is repeated N−1 times. In this case, N−1 normal vectors are basically acquired for a point of interest. Of these normal vectors, the most reliable one, a mean vector thereof, a vector estimated by statistical processing, or the like is used as a final normal vector.

It should be noted, however, that a normal vector may not be acquired in S40 because of inconsistency in degree of polarization for all the pixels on the straight line obtained by projecting the line-of-sight vector L1. For this reason, this condition may be taken advantage of to calculate the reliability level in S42. That is, a ratio of the number of normal vectors actually acquired to the number of normal vectors N−1 to be acquired is used as a reliability level. It should be noted that only one of the several reliability levels described so far may be selected, or the plurality thereof may be combined for calculation from a multilateral point of view.

FIG. 14 depicts diagrams for describing a technique for evaluating the reliability level of the normal vector by use of the relation between the zenith angle and the degree of polarization in S40 in FIG. 12. First, a graph 138a depicted by a dotted line in (a) indicates the relation between the zenith angle and the degree of polarization for specular reflected light depicted in (a) of FIG. 4. In the case where all the observed light is specular reflected light, the relation exhibits a change as depicted by the graph 138a. In reality, a diffuse reflection component is often included. Therefore, the relation exhibits a change obtained by multiplying the degree of polarization of the graph 138a by a given ratio λ (0<λ<1) as depicted by a graph 138b.

For this reason, the ratio λ is calculated as follows by using a zenith angle θ1 determined by the estimated normal vector and the first viewpoint line-of-sight vector L1:

$$\lambda = \rho_{ob\_1}/\rho_{th\_1}$$

where $\rho_{th\_1}$ is the degree of polarization at the zenith angle θ1 in the case of presence of only specular reflection, and $\rho_{ob\_1}$ is the actual degree of polarization calculated from the first viewpoint polarization image by Formulas 1 and 2. That is, a degree of polarization $\rho_{ob}$ of light from the same point of interest on the subject represented by the graph 138b can be expressed by the following function by use of the ratio λ and the function $\rho_{th}(\theta)$ of the degree of polarization of only specular reflection:

$$\rho_{ob}(\theta) = \lambda * \rho_{th}(\theta)$$

In (b) of FIG. 14, the graph 138b of the degree of polarization $\rho_{ob}(\theta)$ is depicted again. In the case of a normal vector of a correct point of interest, the degree of polarization of light observed at the second viewpoint should satisfy the graph 138b. Letting the zenith angle at the second viewpoint be denoted as θ2, a degree of polarization $\rho_{est\_2}$ in that case is theoretically as follows:

$$\rho_{est\_2} = \lambda * \rho_{th}(\theta 2)$$

Meanwhile, an actual degree of polarization $\rho_{ob\_2}$ calculated by Formulas 1 and 2 is separately acquired from the second viewpoint polarization image. If a difference $\Delta\rho=|\rho_{ob\_2}-\rho_{est\_2}|$ therebetween is smaller than a given threshold, it is determined that the degree of polarization is not inconsistent, and if the difference is equal to or higher than the threshold, it is determined that the degree of polarization is inconsistent.

As described above, the point-of-interest information acquisition section 64 may conclude, when a normal vector whose degree of polarization is not inconsistent is acquired, that the normal vector in question is a true value. Alternatively, the point-of-interest information acquisition section 64 may calculate a function where the smaller $\Delta\rho$, the larger the value as a reliability level of the normal vector and associate the function with the normal vector in advance, and then select, at a later time, the most reliable normal vector. Also, the selected normal vector may be associated with the reliability level in question and recorded in the main memory or the like.

Figure 15:
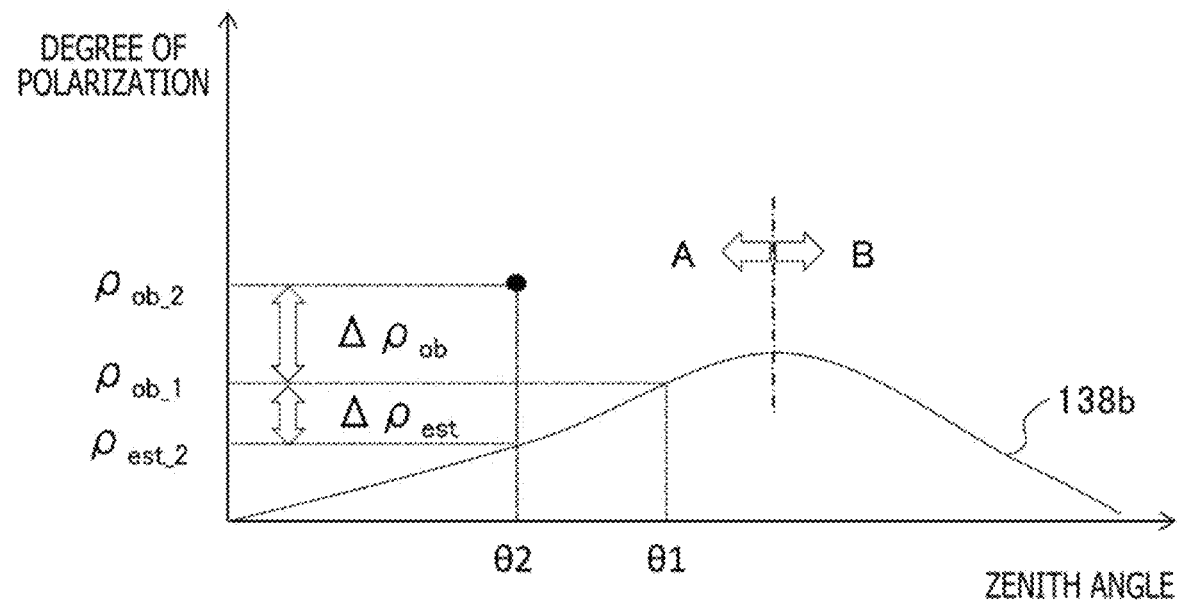
FIG. 15 is a diagram for describing another example of the technique for evaluating the reliability level of the normal vector by use of the relation between the zenith angle and the degree of polarization in S40 in FIG. 12.

FIG. 15 is a diagram for describing another example of the technique for evaluating the reliability level of the normal vector by use of the relation between the zenith angle and the degree of polarization in S40 in FIG. 12. In this example, a relation in magnitude between the zenith angles θ1 and θ2 of the normal vectors relative to the first and second viewpoints and a relation in magnitude between the degrees of polarization are used. That is, position coordinates (θ1, $\rho_{ob\_1}$) on the graph 138b representing the degree of polarization are uniquely determined by the zenith angle θ1 obtained at the first viewpoint for the estimated normal vector. The degree-of-polarization graph 138b is divided into two regions, a monotonously increasing region A and a monotonously decreasing region B, with a maximum point as a boundary.

Therefore, it is possible to identify whether the degree of polarization ρ increases or decreases with increase in the zenith angle θ depending upon in which region the zenith angle θ is located. In the case where the position coordinates (θ1, $\rho_{ob\_1}$) are located in the monotonously increasing region A as illustrated, and if the zenith angle θ2 relative to the second viewpoint is smaller than θ1, the degree of polarization $\rho_{est\_2}$ therefor should be smaller than the degree of polarization $\rho_{ob\_1}$ of the first viewpoint. In contrast, in the case where the actual degree of polarization $\rho_{ob\_2}$ calculated by Formulas 1 and 2 from the polarization image of the second viewpoint is larger than $\rho_{ob\_1}$ as illustrated, it can be said that the reliability level of the estimated normal vector is low.

According to this technique, it is possible to evaluate the reliability level of a normal vector from the relation in magnitude between the zenith angle and the degree of polarization without obtaining a function of degree of polarization such as that illustrated in FIG. 14 in a rigorous manner. Here, whether the degree of polarization increases or decreases properly with change in the zenith angle may be used as a sole evaluation criterion. Alternatively, an increment or a decrement of the degree of polarization may be further evaluated. The former qualitative evaluation is suitable for the case where an observation system has much noise, with relatively poorly accurate zenith angle, degree of polarization, and other values, allowing for evaluation with the error in question factored in. The latter quantitative evaluation is suitable for the case where the observation system has a relatively highly accurate zenith angle, degree of polarization, and other values, thus allowing for rigorous evaluation.

It should be noted, however, that the latter technique requires that a function of the degree of polarization relative to the zenith angle be obtained in consideration of a diffuse reflection component in a manner similar to that illustrated in FIG. 14. On top of that, a supposed variation in degree of polarization $\Delta\rho_{est}$ and an actual variation in degree of polarization $\Delta\rho_{ob}$ when the zenith angle changes from θ1 to θ2 are defined as follows:

$$\Delta\rho_{est}=\rho_{est\_2}-\rho_{ob\_1}$$

$$\Delta\rho_{ob}=\rho_{ob\_2}-\rho_{ob\_1}$$

Then, a reliability level r is obtained by using a difference $d=|\Delta\rho_{ob}-\Delta\rho_{est}|$ between the two as follows:

$$r=\max(0,1-d/c)$$

where 1/c is a fixed coefficient. This reliability level r is a function that is 1 when the difference d is 0, linearly decreases when the difference d is 0<d<c, and is 0 when the difference d is equal to or larger than c. Therefore, an appropriate value is assigned to c in advance as a threshold of the difference d when the reliability level is 0.

Figure 16:
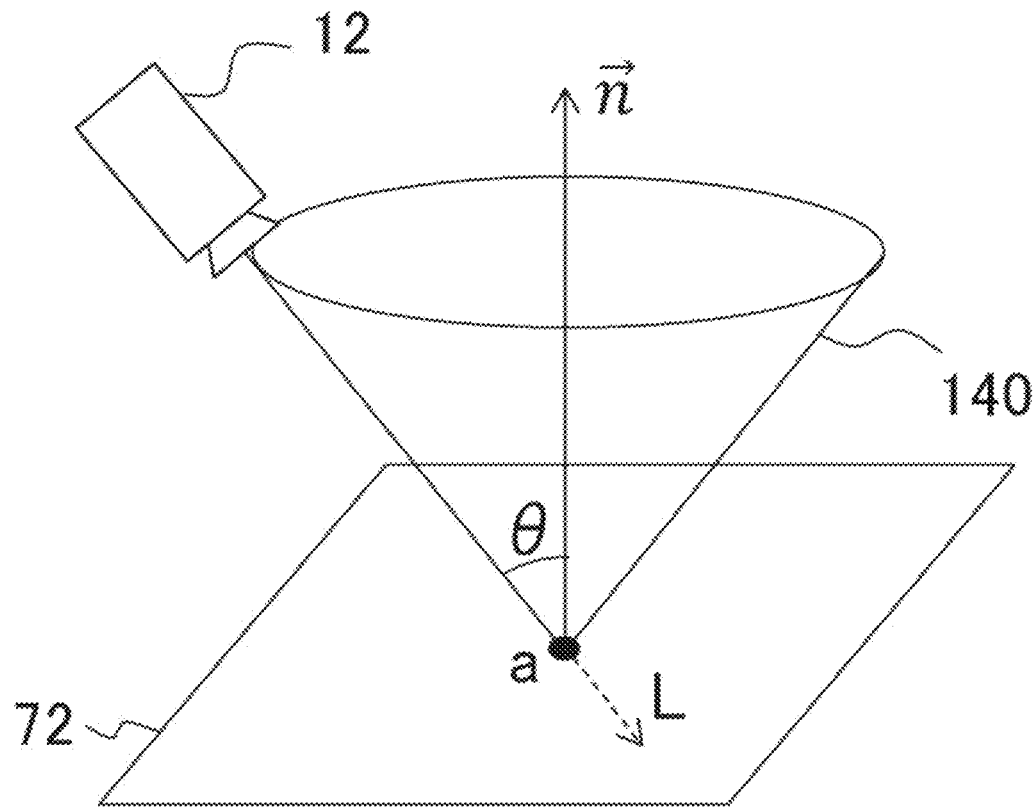
FIG. 16 is a diagram for describing adequacy of use of the degree of polarization for evaluating the reliability level of the normal vector in the present embodiment.

FIG. 16 is a diagram for describing adequacy of using the degree of polarization for evaluating a reliability level of the normal vector in the present embodiment. In the present embodiment, an image is captured from the first viewpoint first, and the second viewpoint is guided in the direction away from the incident plane at the point of interest 'a' and such that the point of interest 'a' remains within the field of view. This means that the viewpoint moves along a trajectory close to a circumference of a bottom of a cone 140 having the point of interest 'a' as its vertex, the zenith angle as its half vertex angle, and the normal vector n as its axis.

That is, even if the viewpoint is moved significantly, the zenith angle θ does not change much. As a result, when polarized light at the same position on the subject is observed from the post-movement viewpoint, the degree of polarization thereof does not change much. For this reason, the selection of a point of interest whose degree of polarization is greater than the threshold provides not only an advantageous effect of making the application of a specular reflection model applicable but also an advantageous effect of permitting efficient extraction of pixels representing the same point of interest even if the viewpoint moves. Also, because the zenith angle θ does not change much, it is highly likely that the degree of polarization thereof remains in the monotonously increasing region or the monotonously decreasing region even if the viewpoint moves as illustrated in FIG. 15. Therefore, the reliability level of the normal vector can be evaluated properly on the basis of the relation in magnitude and the difference between the degrees of polarization.

According to the modes described so far, it is possible to identify, solely from a polarization image, a normal vector and position coordinates thereof even in the absence of a feature point such as a pattern on the subject surface. Meanwhile, if a location where a feature point exists is selected as a point of interest, the position where the point of interest in question appears in the captured image of each viewpoint can be identified, thus simplifying the processes. That is, as illustrated in FIG. 13, there is no need to search for a pixel of interest on the straight line obtained by projecting the first viewpoint line-of-sight vector, thus allowing for an accurate pixel of interest to be identified from a feature point silhouette. Therefore, by obtaining, of the second viewpoint captured image, an incident plane relative to the pixel of interest in question, it is possible to obtain a normal vector from the line of intersection between the incident planes of the first and second viewpoints.

Similarly, it is possible to obtain position coordinates of the point of interest in the world coordinate system from the intersection between the first and second line-of-sight vectors. In this mode, there is no need to search for a pixel of interest on the basis of the reliability level of the normal vector as described above. Therefore, it is also possible to obtain position coordinates of the point of interest directly without obtaining a normal vector.

Figure 17:
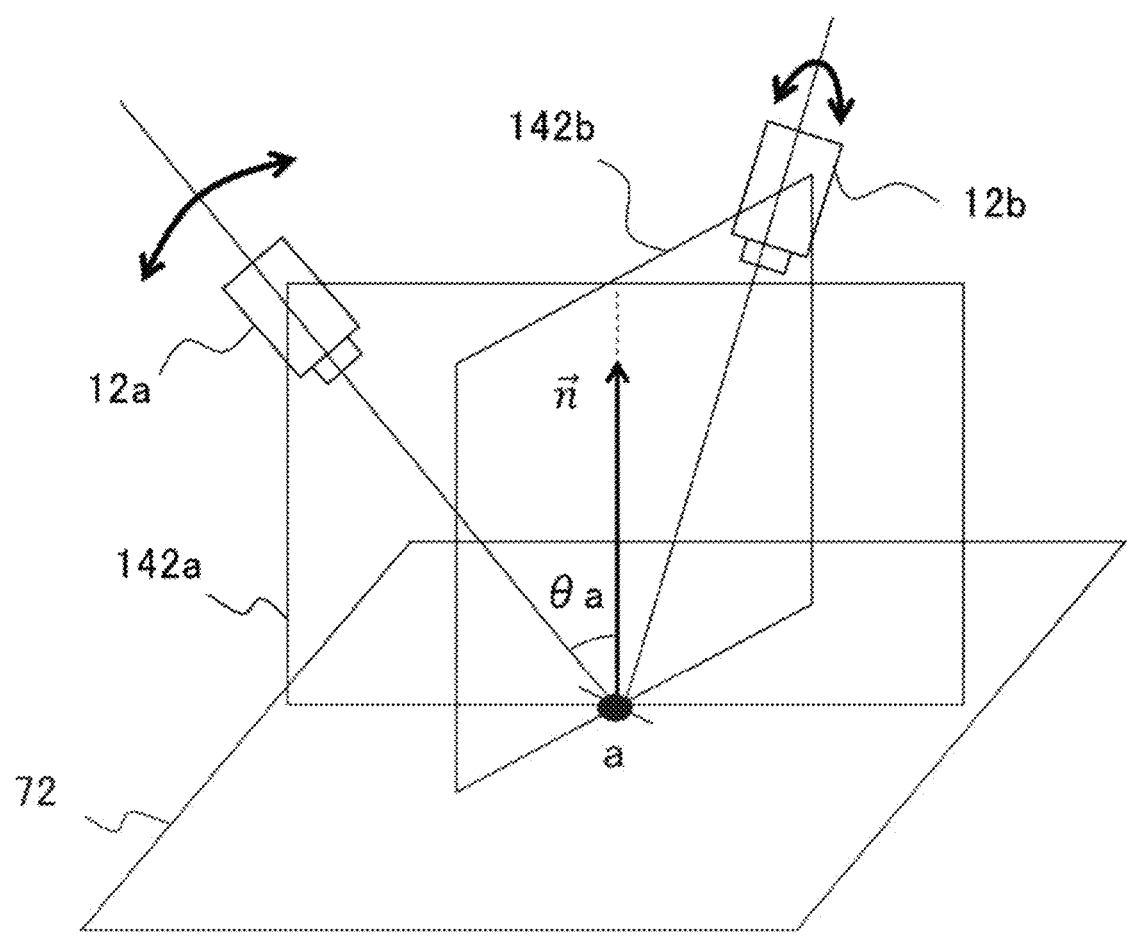
FIG. 17 is a diagram for describing a technique for identifying an incident plane on the basis of the change in the degree of polarization relative to the zenith angle θ in the present embodiment.

In the modes described so far, the angle of the incident plane at each viewpoint is obtained basically from the phase angle ψ in Formula 1. Meanwhile, incident planes may be obtained by use of the fact that the degree of polarization depends only upon the zenith angle θ as illustrated in FIG. 14. FIG. 17 is a diagram for describing a technique for identifying an incident plane on the basis of the change in the degree of polarization relative to the zenith angle θ. As described above, a silhouette of the point of interest 'a' on the subject 72 is obvious even when the viewpoint of the imaging apparatus 12 changes.

Here, in order to determine an incident plane 142a of the first viewpoint, a search is made of the direction where a rate of change of a zenith angle θa is the largest. That is, the position and posture of the imaging apparatus 12a are changed in various ways to acquire the direction where the variation in degree of polarization relative to the change in unit angle of the line-of-sight vector is the largest. The plane including the direction of movement of the viewpoint and the point of interest 'a' is the incident plane 142a. In other words, the incident plane 142a remains unchanged even if the viewpoint changes in the direction of movement in question. Therefore, it is only necessary to select a point in the direction of movement in question as the "first viewpoint" in this case. As for the second viewpoint, the imaging apparatus 12b is similarly changed in various ways, and the plane including the direction of movement of the viewpoint and the point of interest 'a' when the rate of variation in degree of polarization is the largest is the incident plane 142b.

In this case, although it is necessary to move the imaging apparatus 12 in a two-dimensional direction such as horizontally or vertically, the viewpoint control section 60 need only guide the viewpoint by presenting, to the user, a direction of movement by image or sound as illustrated in FIG. 11. It should be noted that an incident plane acquired by Formula 1 may be integrated with a result of an incident plane obtained from the rate of change of the degree of polarization. For example, the mean of the two may be used as a true incident plane angle. Also, a different technique may be used to derive each incident plane. For example, an incident plane of the first viewpoint may be obtained from the phase angle ψ, and incident planes of other viewpoints may be obtained from the rate of change of the degree of polarization.

Also, in the modes described so far, a specular reflection model is applied by selecting a pixel of interest having a degree of polarization equal to or higher than a threshold as a target. Meanwhile, the use of the difference in behavior of the degree of polarization relative to the change in the zenith angle θ makes it possible to apply the present embodiment also to light where diffuse reflection is predominant. For example, in the case where, when the viewpoint is moved such that the zenith angle θ changes, the rate of change of the degree of polarization does not become a given value or higher no matter in which direction the viewpoint is moved, it is probable that light where diffuse reflection is predominant is being observed.

The reason for this is that the rate of change of the degree of polarization is higher with specular reflection in an almost entire range of the zenith angle as illustrated in FIG. 4. In such a case, an incident plane is derived by applying a diffuse reflection model. That is, we assume that there is an incident plane at the angle indicated by the phase angle ψ in Formula 1. Any other processes are similar to those described above regarding specular reflection.

According to the present embodiment described above, it is possible to introduce a specular reflection model for subsequent computations by selecting a pixel of interest having a degree of polarization equal to or higher than a threshold as a target to be processed in image analysis based on a polarization image. Also, a pixel with a large amplitude relative to a polarization luminance azimuth is selected, thus allowing for a phase angle to be obtained with high accuracy. As a result, the incident plane angle for the point of interest on the subject represented by the pixel of interest in question can be acquired with high accuracy.

Also, the viewpoint is moved in an appropriate direction with reference to an incident plane acquired for a certain viewpoint, and the same point of interest on the subject is captured, thus acquiring a plurality of incident planes and acquiring, in the world coordinate system, a normal vector of the point of interest from a line of intersection of the incident planes. The direction of movement of the viewpoint can be determined in such a manner as to ensure accuracy in normal relative to the first viewpoint, a reference, thus making it possible to obtain normals efficiently with a small number of image captures. Also, the direction of movement is clear, thus allowing for image capture to readily be completed without much time and effort even when the user manually moves the viewpoint by giving simple instructions by image or sound.

Also, the line-of-sight vector from the first viewpoint toward the point of interest is projected onto the image plane of the second viewpoint, and a search is made, on the straight line, of a point where a highly reliable normal vector can be acquired. Further, the position coordinates of the point of interest in the world coordinate system are acquired from the intersection between the line-of-sight vector from the second viewpoint to the position in question and the line-of-sight vector from the first viewpoint to the point of interest. This makes it possible to acquire subject state information in the world coordinate system even in the absence of a feature point at the point of interest on the subject or even if the position of the point of interest in question is unknown.

The present embodiment as a whole uses the relation between the zenith angle and the degree of polarization of a normal vector of the subject, thus allowing subject information to be acquired with high robustness in the face of an apparent change in luminance attributable to brightness of the imaging environment, the viewpoint position, a shadow, and the like. Also, detailed information regarding regions with a high degree of polarization, i.e., regions close to a Brewster's angle where a reflectance of p polarized light is 0 is acquired, providing excellent affinity, for example, to the technique disclosed in NPL 1 that carries out image analysis by using the Brewster's angle as a parameter and making application to further image analysis possible.

The present invention has been described above on the basis of an embodiment. The above embodiment is illustrative, and it is understood by a person skilled in the art that the combination of constituent elements and processes thereof can be modified in various ways and that such modification examples also fall within the scope of the present invention.

REFERENCE SIGNS LIST

10 Information processing apparatus, 12 Imaging apparatus, 16 Display apparatus, 23 CPU, 24 GPU, 26 Main memory, 50 Captured image acquisition section, 52 Image data storage section, 53 Imaging apparatus information acquisition section, 54 Subject information acquisition section, 56 Output data generation section, 60 Viewpoint control section, 64 Point-of-interest information acquisition section

INDUSTRIAL APPLICABILITY

As described above, the present invention is applicable to various types of information processing apparatuses such as a gaming apparatus, a mobile terminal, a monitoring camera system, a vehicle-mounted camera system, and an inspection apparatus.

The invention claimed is:

1. An information processing apparatus comprising:
a captured image acquisition section adapted to acquire data of polarization images in a plurality of azimuths captured by an imaging apparatus from different viewpoints;
an imaging apparatus information acquisition section adapted to acquire information regarding a position and posture of the imaging apparatus as viewpoint information; and
a point-of-interest information acquisition section adapted to set, of each of the polarization images, a pixel whose degree of polarization is equal to or higher than a given threshold or is maximum, as a pixel of interest, acquire state information of a point of interest on a subject represented by the pixel of interest in a world coordinate system on a basis of polarization luminance from the same point of interest observed at each viewpoint, and output the state information.

2. The information processing apparatus of claim 1, wherein the point-of-interest information acquisition section sets the pixel of interest in a polarization image captured from a first viewpoint first and searches for a pixel representing the same point of interest on a straight line obtained by projecting a first line-of-sight vector passing through the pixel of interest from the first viewpoint onto a plane of an image captured from a second viewpoint.

3. The information processing apparatus of claim 2, wherein the point-of-interest information acquisition section acquires a normal vector of the subject when a pixel representing the same point of interest is assumed to exist at a plurality of sampling points on the straight line and identifies the pixel representing the same point of interest and the normal vector at the point of interest by obtaining a reliability level of the normal vector on a basis of a relation between a zenith angle and a degree of polarization determined on a basis of the normal vector.

4. The information processing apparatus of claim 3, wherein the point-of-interest information acquisition section acquires, of the sampling points, an incident plane of light observed at the second viewpoint for a sampling point whose degree of polarization is equal to or higher than a given threshold and acquires a line of intersection with the incident plane acquired for the pixel of interest of the first viewpoint as the normal vector.

5. The information processing apparatus of claim 3, wherein the point-of-interest information acquisition section acquires a function of an actual degree of polarization on a basis of a function of a degree of polarization of specular reflected light relative to the zenith angle of the normal vector of the subject and the relation between the zenith angle and the degree of polarization acquired for the pixel of interest of the first viewpoint and obtains the reliability level on a basis of a difference from the degree of polarization actually acquired for the sampling point.

6. The information processing apparatus of claim 3, wherein the point-of-interest information acquisition section obtains the reliability level by comparing a slope of a function of a degree of polarization of specular reflected light relative to the zenith angle of the normal vector of the subject with a slope of the degree of polarization acquired for the pixel of interest of the first viewpoint and the sampling point.

7. The information processing apparatus of claim 3, wherein the point-of-interest information acquisition section acquires a function of an actual degree of polarization on a basis of a function of a degree of polarization of specular reflected light relative to the zenith angle of the normal vector of the subject and the relation between the zenith angle and the degree of polarization acquired for the pixel of interest of the first viewpoint and obtains the reliability level by comparing variations in the degree of polarization acquired for the pixel of interest of the first viewpoint and the sampling point.

8. The information processing apparatus of claim 3, wherein the point-of-interest information acquisition section performs a process of identifying a normal vector at the point of interest N-1 times by using polarization images captured from N viewpoints, where N is a natural number equal to or larger than 2, determines a final normal vector by integrating the normal vectors that provide a reliability level equal to or higher than a given value, and assigns a ratio of the normal vectors that provide the reliability level as a reliability level of the final normal vector.

9. The information processing apparatus of claim 3, wherein the point-of-interest information acquisition section calculates a reliability level by comparing the normal vector identified for the point of interest or a refractive index of the subject estimated on a basis of the zenith angle and the degree of polarization of the normal vector with a result acquired for another point of interest and uses the reliability level as additional data of the normal vector.

10. The information processing apparatus of claim 2, wherein
the point-of-interest information acquisition section acquires a second line-of-sight vector passing through a pixel representing the same point of interest from the second viewpoint and acquires an intersection with the first line-of-sight vector as position coordinates of the point of interest.

11. The information processing apparatus of claim 1, wherein the point-of-interest information acquisition section acquires an incident plane of light for each viewpoint on a basis of polarization luminance from the same point of interest observed at each viewpoint and acquires a line of intersection therebetween as a normal vector of the point of interest.

12. A subject information acquisition method by an information processing apparatus, comprising:
acquiring data of polarization images in a plurality of azimuths captured by an imaging apparatus from different viewpoints;

acquiring information regarding a position and posture of the imaging apparatus as viewpoint information; and setting, of each of the polarization images, a pixel whose degree of polarization is equal to or higher than a given threshold or is maximum, as a pixel of interest, acquiring state information of a point of interest on a subject represented by the pixel of interest in a world coordinate system on a basis of polarization luminance from the same point of interest observed at each viewpoint, and outputting the state information.

13. A non-transitory, computer readable storage medium containing a computer program, which when executed by a computer, causes the computer to carry out actions, comprising:

acquiring data of polarization images in a plurality of azimuths captured by an imaging apparatus from different viewpoints;

acquiring information regarding a position and posture of the imaging apparatus as viewpoint information; and setting, of each of the polarization images, a pixel whose degree of polarization is equal to or higher than a given threshold or is maximum, as a pixel of interest, acquiring state information of a point of interest on a subject represented by the pixel of interest in a world coordinate system on a basis of polarization luminance from the same point of interest observed at each viewpoint, and outputting the state information.

* * * * *